United States Patent
Ryu et al.

(10) Patent No.: US 12,302,285 B2
(45) Date of Patent: *May 13, 2025

(54) PAGING TIME ADJUSTMENT IN A WIRELESS NETWORK

(71) Applicant: Peninsula Technologies, LLC, Allen, TX (US)

(72) Inventors: Jinsook Ryu, Oakton, VA (US); Esmael Hejazi Dinan, McLean, VA (US); Kyungmin Park, Vienna, VA (US); Peyman Talebi Fard, Vienna, VA (US); Weihua Qiao, Herndon, VA (US)

(73) Assignee: Peninsula Technologies, LLC, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,379

(22) Filed: Jan. 26, 2024

(65) Prior Publication Data

US 2024/0172179 A1   May 23, 2024

Related U.S. Application Data

(63) Continuation of application No. 18/103,293, filed on Jan. 30, 2023, now Pat. No. 11,889,471, which is a
(Continued)

(51) Int. Cl.
*H04W 68/00* (2009.01)
*H04W 28/086* (2023.01)
(Continued)

(52) U.S. Cl.
CPC ..... *H04W 68/005* (2013.01); *H04W 28/0865* (2023.05); *H04W 68/02* (2013.01);
(Continued)

(58) Field of Classification Search
CPC ....... H04W 4/50–80; H04W 8/00–265; H04W 84/02–027
See application file for complete search history.

(56) References Cited

U.S. PATENT DOCUMENTS

| | | |
|---|---|---|
| 6,922,561 B2 | 7/2005 | Chen et al. |
| 8,644,875 B2 | 2/2014 | Kiukkonen et al. |
| 9,066,240 B2 | 6/2015 | Sadek et al. |
| 9,271,148 B2 | 2/2016 | Bone |
| 9,521,701 B2 | 12/2016 | Su et al. |

(Continued)

FOREIGN PATENT DOCUMENTS

| | | |
|---|---|---|
| WO | 2013/052868 A1 | 4/2013 |
| WO | 2013/165285 A1 | 11/2013 |

(Continued)

OTHER PUBLICATIONS

3GPP TS 23.041 V16.0.0 (Mar. 2019); Technical Specification; 3rd Generation Partnership Project; Technical Specification Group Core Network and Terminals; Technical realization of Cell Broadcast Service (CBS); (Release 16).
(Continued)

*Primary Examiner* — San Htun
(74) *Attorney, Agent, or Firm* — Ascenda Law Group, PC

(57) ABSTRACT

A base station receives, from a wireless device, a requested international mobile subscriber identity (IMSI) offset value for offsetting an IMSI of the wireless device. The base station sends, to a core network node, the requested IMSI offset value. The base station receives, from the core network node, an accepted IMSI offset value for offsetting the IMSI of the wireless device, wherein first paging occasions of the first PLMN are derived using an alternative IMSI determined based on a sum of the IMSI of the wireless device and the accepted IMSI offset value. The base station sends, to the wireless device, the accepted IMSI offset value.

20 Claims, 37 Drawing Sheets

Related U.S. Application Data continuation of application No. 17/838,628, filed on Jun. 13, 2022, now Pat. No. 11,665,668, which is a continuation of application No. 16/846,005, filed on Apr. 10, 2020, now Pat. No. 11,368,937.

(60) Provisional application No. 62/833,264, filed on Apr. 12, 2019.

(51) Int. Cl.
| | |
|---|---|
| *H04W 68/02* | (2009.01) |
| *H04W 76/28* | (2018.01) |
| *H04W 84/02* | (2009.01) |
| *H04W 4/60* | (2018.01) |

(52) U.S. Cl.
CPC ......... *H04W 76/28* (2018.02); *H04W 84/027* (2013.01); *H04W 4/60* (2018.02)

(56) References Cited

U.S. PATENT DOCUMENTS

| | | | |
|---|---|---|---|
| 10,154,472 | B1 | 12/2018 | Govindassamy |
| 10,334,525 | B1 | 6/2019 | Govindassamy |
| 2010/0248752 | A1 | 9/2010 | Yu |
| 2010/0279715 | A1* | 11/2010 | Alanara ............... H04W 68/02 455/458 |
| 2012/0020256 | A1 | 1/2012 | Tujkovic et al. |
| 2012/0088501 | A1 | 4/2012 | Chin et al. |
| 2012/0088502 | A1* | 4/2012 | Chin ............... H04W 52/0216 455/433 |
| 2012/0282924 | A1 | 11/2012 | Tagg et al. |
| 2013/0244660 | A1 | 9/2013 | Kumar et al. |
| 2013/0295920 | A1 | 11/2013 | Viswanadham et al. |
| 2013/0337826 | A1* | 12/2013 | Fix ..................... G01S 5/0252 455/456.1 |
| 2014/0128082 | A1 | 5/2014 | Chirayil |
| 2014/0248915 | A1* | 9/2014 | Chandramouli .... H04W 84/027 455/458 |
| 2015/0017982 | A1 | 1/2015 | Klatt |
| 2015/0018021 | A1 | 1/2015 | Dhanda et al. |
| 2015/0141017 | A1 | 5/2015 | Krishnamoorthy et al. |
| 2015/0163827 | A1 | 6/2015 | Ekici |
| 2015/0350877 | A1 | 12/2015 | Li et al. |
| 2016/0029434 | A1* | 1/2016 | Qiu .................. H04W 52/0209 370/311 |
| 2016/0080970 | A1* | 3/2016 | Harris ............... H04W 36/04 455/458 |
| 2017/0230932 | A1 | 8/2017 | Challa et al. |
| 2017/0303235 | A1 | 10/2017 | Deogun et al. |
| 2018/0042054 | A1 | 2/2018 | Han |
| 2018/0070331 | A1 | 3/2018 | Byun et al. |
| 2018/0255450 | A1 | 9/2018 | Kumar et al. |
| 2018/0343617 | A1 | 11/2018 | Siann et al. |
| 2018/0343638 | A1 | 11/2018 | Balasubramanian et al. |
| 2018/0368099 | A1 | 12/2018 | Chen et al. |
| 2019/0037531 | A1* | 1/2019 | Pantus ................ H04W 68/02 |
| 2020/0196273 | A1 | 6/2020 | Ozturk et al. |
| 2020/0374833 | A1 | 11/2020 | Guo et al. |

FOREIGN PATENT DOCUMENTS

| | | |
|---|---|---|
| WO | 2014/129960 A1 | 8/2014 |
| WO | 2018/005419 A1 | 1/2018 |
| WO | 2018/161244 A1 | 9/2018 |
| WO | 2019/174444 A1 | 9/2019 |
| WO | 2020/178483 A1 | 9/2020 |

OTHER PUBLICATIONS

3GPP TS 23.401 V16.2.0 (Mar. 2019); Technical Specification; 3rd Generation Partnership Project; Technical Specification Group Services and System Aspects; General Packet Radio Service (GPRS) enhancements for Evolved Universal Terrestrial Radio Access Network(E-UTRAN) access; (Release 16).
3GPP TS 23.501 V16.0.2 (Apr. 2019); Technical Specification; 3rd Generation Partnership Project; Technical Specification Group Services and System Aspects; System Architecture for the 5G System; Stage 2; (Release 16).
3GPP TS 23.502 V16.0.0 (Mar. 2019); Technical Specification; 3rd Generation Partnership Project; Technical Specification Group Services and System Aspects; Procedures for the 5G System; Stage 2; (Release 16).
3GPP TS 24.501 V15.2.1 (Jan. 2019); Technical Specification; 3rd Generation Partnership Project; Technical Specification Group Core Network and Terminals; Non-Access-Stratum (NAS) protocol for 5G System (5GS); Stage 3; (Release 15).
3GPP TS 36.331 V15.5.0 (Mar. 2019); Technical Specification; 3rd Generation Partnership Project; Technical Specification Group Radio Access Network; Evolved Universal Terrestrial Radio Access (E-UTRA); Radio Resource Control (RRC); Protocol specification; (Release 15).
3GPP TS 38.331 V15.5.0 (Mar. 2019); Technical Specification; 3rd Generation Partnership Project; Technical Specification Group Radio Access Network; NR; Radio Resource Control (RRC) protocol specification; (Release 15).
3GPP TS 38.413 V15.3.0 (Mar. 2019); 3rd Generation Partnership Project; Technical Specification Group Radio Access Network; NG-RAN; NG Application Protocol (NGAP); (Release 15).
R2-115375; 3GPP TSG-RAN WG2 #75bis; Zhuhai, China Oct. 10-14, 2011; Agenda Item: 04.1; Source: Ericsson; Title: Dual-SIM Dual-Standby UEs and their impact on the RAN; Document for: Discussion, Decision.
S2-164763; SA WG2 Meeting #116-BIS; Aug. 29-Sep. 2, 2016, Sanya, P. R. China; (revision of S2-163492); Source: Intel, Huawei; Title: IMS paging type differentiation for PS domain; Document for: Discussion / Approval; Agenda Item: 6.28; Work Item / Release: TEI14 / Rel-14.
S2-174243; SA WG2 Meeting #122; Jun. 26-30, 2017, San Jose Del Cabo , Mexico; Source: Qualcomm Incorporated, Oppo, China Unicom, Vivo; Title: Avoidance of paging collisions to minimize outage of services; Document for: Discussion; Agenda Item: TEI15; Work Item / Release: Rel-15.
S2-1813349; SA WG2 Meeting #129bis; Nov. 26-30, 2018, West Palm Beach, USA; (was S2-1813346); Source: Intel, Verizon, AT&T, Sony, Samsung, Charter Communications, China Mobile, Lenovo, Motorola Mobility, NEC, vivo, OPPO, KPN, ETRI, InterDigital, Convida Wireless; Title: New SID: Study on system enablers for multi-SIM devices; Document for: Approval; Agenda Item: 7.1.
S2-181868; SA WG2 Meeting #126; Feb. 26-Mar. 2, 2018, Montreal, Canada; Source: Qualcomm Incorporated, Intel; Title: Paging cause to the UE; Document for: Discussion/Approval; Agenda Item: 6.5.1; Work Item / Release: 5GS_Ph1/Rel. 15.
S2-1900688; SA WG2 Meeting #130; Jan. 21-25, 2019, Kochi, India; (revision of S2-1900332); Source: Intel; Title: Revised SID: Study on system enablers for multi-SIM devices; Document for: Approval; Agenda Item: 7.1; Work Item / Release: FS_MUSIM / Rel-16.
Policy Paging Differentiation; P-GW Administration Guide, StarOS Release 20; pp. 1-6; Cisco; Mar. 23, 2017; <https://www.cisco.com/c/en/us/td/docs/wireless/asr_5000/20/P-GW/b_20_PGW_Admin/b_20_PGW_Admin_chapter_0100001.html>.
The Patent Act, 1970 (39 of 1970) and The Patent Rules, 2003 (As Amended); "Paging Block Rate Control in Dual-Sim-Dual-Standby {DSDS} Handsets"; Qualcomm Incorporated, a corporation organized and existing under the laws of USA of ATTN: International IP Administration, 5775 Morehouse Drive, San Diego, California 92121-1714, USA.
3GPP TS 24.301 V17.5.0 (Dec. 2021); Technical Specification; 3rd Generation Partnership Project; Technical Specification Group Core Network and Terminals; Non-Access-Stratum (NAS) protocol for Evolved Packet System (EPS); Stage 3; (Release 17).

(56) References Cited

OTHER PUBLICATIONS

R2-2201486; 3GPP TSG-RAN WG2 Meeting #116-bis-e; Electronic meeting, Jan. 1-12, 2022; Change Request; 36.300; CR -; rev -; Current version: 16.7.0.
C1-221754; 3GPP TSG CT WG1 Meeting#134-e; Electronic meeting, Feb. 17-25, 2022; SA WG2 Meeting #149-e (e-meeting); S2-2201681; Feb. 14-25, 2022, Elbonia; Title: Reply LS on alternative IMSI for MUSIM; Reply to: LS to SA2 and CT1 on alternative IMSI for MUSIM (R2-2201718, S2-2201252) and LS on RAN2 agreements for MUSIM (R2-2111329/S2-2200018); Release: Release 17; Work Item: MUSIM.
R2-2203273; 3GPP TSG-RAN WG2 Meeting #117-e; Electronic meeting, Feb. 21-Mar. 3, 2022; Change Request; 36.304; CR 0842; rev; Current version: 16.6.0.

* cited by examiner

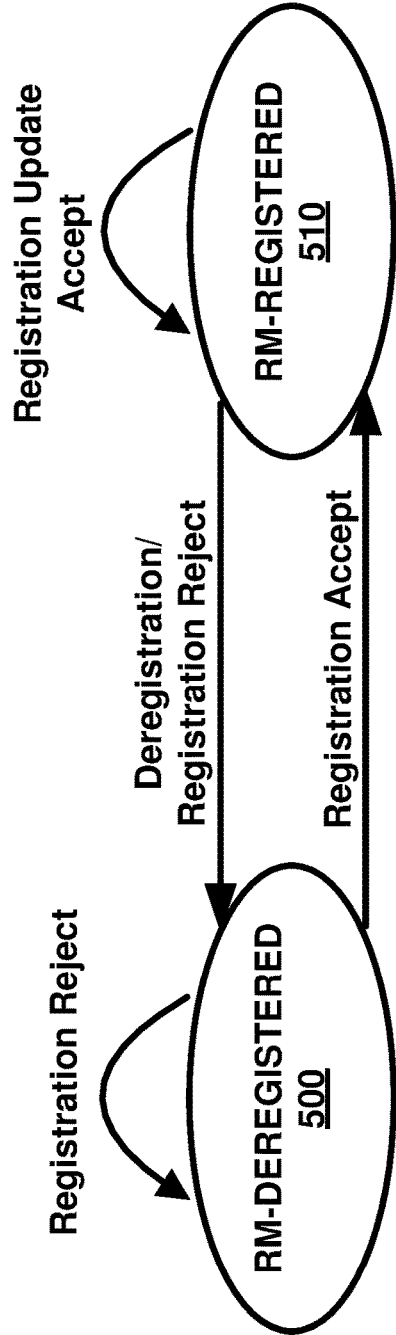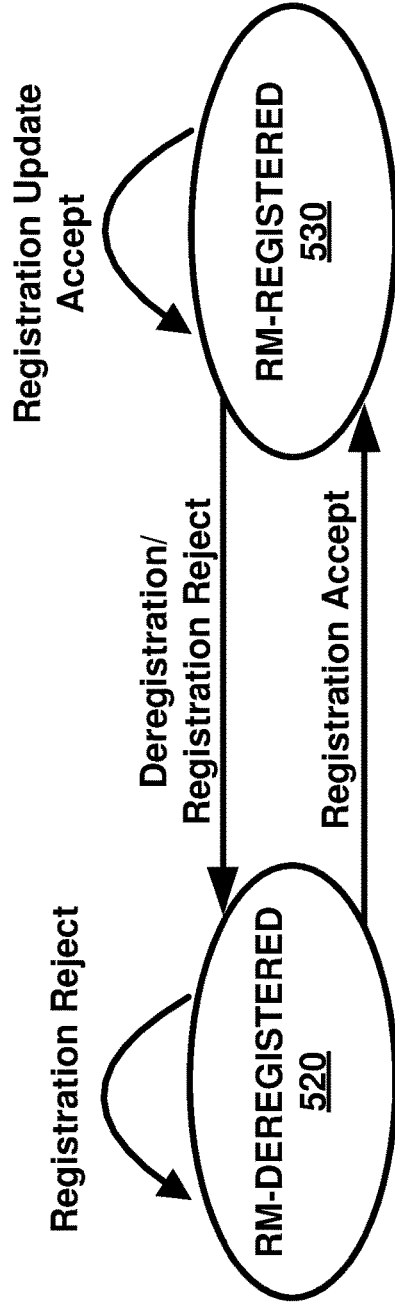
FIG. 5A  RM State Transition in UE
FIG. 5B  RM State Transition in AMF CM State Transition in UE CM State Transition in AMF Call flow for RRC state transition Radio frame structure for normal paging occasion

| DRX parameter | Notation | Value range | Configuring network node |
|---|---|---|---|
| UE specific DRX cycle | Tue | 32, 64, 128, 256 (radio frames) | MME/AMF |
| Cell specific DRX cycle | Tc | 32, 64, 128, 256 (radio frames) | eNB/gNB |
| Number of paging occasions per DRX cycle | nB | 4T, 2T, T, T/2, T/4, T/8, T/16, T/32 | eNB/gNB |

DRX parameters

FIG. 19A

| DRX cycle of UE | T | min (Tue, Tc) in radio frames |
|---|---|---|
| Number of paging frames within UE's DRX cycle | N | Min (T, nB) |
| Number of paging sub frames used for paging within a paging frame | Ns | Max (1, nB/T) |

Input parameters for paging occasion calculation

FIG. 19B

SFN for the PF: SFN mod T= (T div N)*(UE_ID mod N)

PO: i_s=floor(UE_ID/N) mod Ns

Equation for PF (paging frame), PO (paging occasion)

FIG. 19C

SFN for the PF: (SFN + PF_offset) mod T = (T div N)*(UE_ID mod N)

PO: i_s = floor (UE_ID/N) mod Ns

Equation for PF (paging frame), PO (paging occasion)

FIG. 19D

| Ns | PO when i_s=0 | PO when i_s=1 | PO when i_s=2 | PO when i_s=3 |
|---|---|---|---|---|
| 1 | 9 | N/A | N/A | N/A |
| 2 | 4 | 9 | N/A | N/A |
| 4 | 0 | 4 | 5 | 9 |

Subframe patterns based on i_s for FDD (frequency division duplexing)

FIG. 20A

| Ns | PO when i_s=0 | PO when i_s=1 | PO when i_s=2 | PO when i_s=3 |
|---|---|---|---|---|
| 1 | 0 | N/A | N/A | N/A |
| 2 | 0 | 5 | N/A | N/A |
| 4 | 0 | 1 | 5 | 6 |

Subframe patterns based on i_s for TDD (time division duplexing)

FIG. 20B

Not more than 15 digits 3 digtis | 2 or 3 digtis

| MCC | MNC |

IMSI

Structure of IMSI

FIG. 21A

```
<GUTI> = <GUMMEI><M-TMSI>
<GUMMEI> = <MCC><MNC><MME Identifier>
<MME Identifier> = <MME Group ID><MME Code>

<S-TMSI> = <MME Code><M-TMSI>
```

Structure of 4G UE identifiers

FIG. 21B

```
<5G-GUTI> = <GUAMI><5G-TMSI>
<GUAMI> = <MCC><MNC><AMF Identifier>
<AMF Identifier> = <AMF Region ID><AMF set ID><AMF Pointer>

<5G-S-TMSI> = <AMF Set ID><AMF Pointer><5G-TMSI>
```

Structure of 5G UE identifiers

FIG. 21C

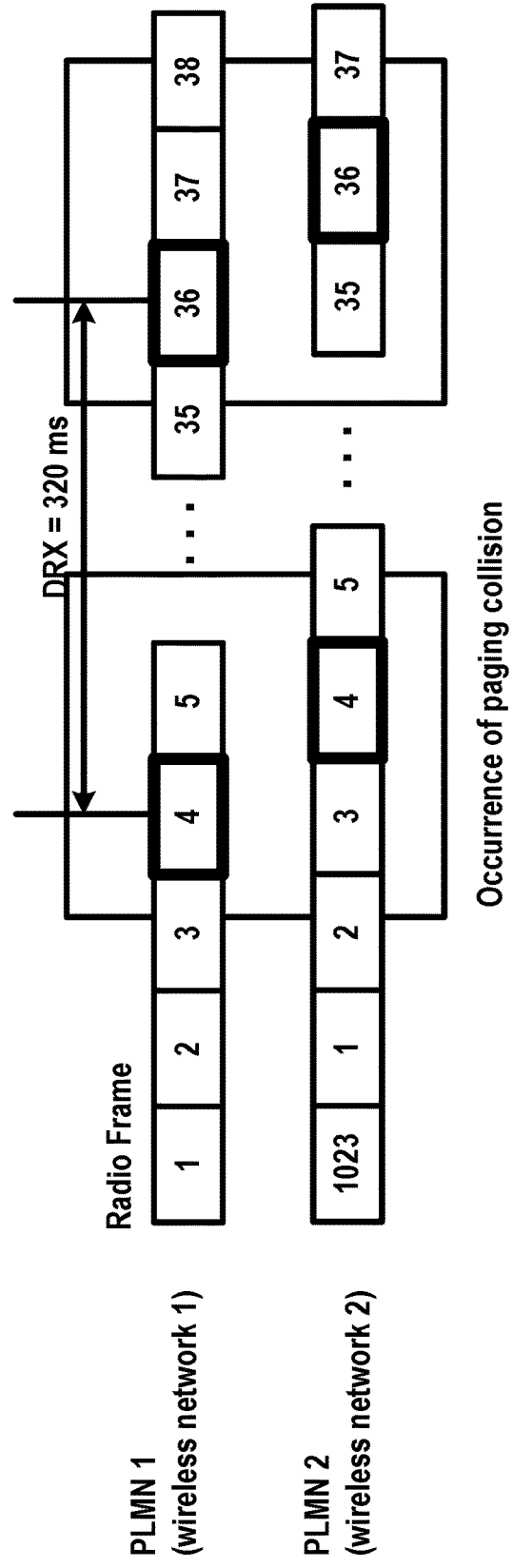
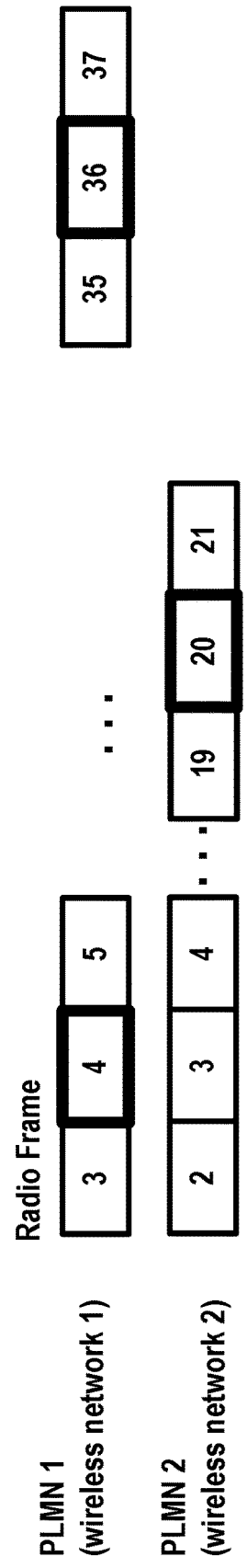
FIG. 26A
FIG. 26B

PAGING TIME ADJUSTMENT IN A WIRELESS NETWORK

CROSS-REFERENCE TO RELATED APPLICATIONS

This application is a continuation of U.S. patent application Ser. No. 18/103,293, filed Jan. 30, 2023, which is a continuation of U.S. patent application Ser. No. 17/838,628, filed Jun. 13, 2022, which is a continuation of U.S. patent application Ser. No. 16/846,005, filed Apr. 10, 2020, which claims the benefit of U.S. Provisional Application No. 62/833,264, filed Apr. 12, 2019, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 19A is an example parameters value for DRX parameters

FIG. 19B is an example parameter for paging occasion calculation.

FIG. 19C is an example equation to derive paging frame and paging occasion for E-UTRA.

FIG. 19D is an example equation to derive paging frame and paging occasion for new radio (NR)

FIG. 20A is an example value for subframe patterns for paging occasion for frequency division duplexing case.

FIG. 20B is an example value for subframe patterns for paging occasion for time division duplexing case.

FIG. 21A is an example structure of an international mobile subscriber identities (IMSI).

FIG. 21B is an example structure of 4G UE identifiers.

FIG. 21C is an example structure of 5G UE identifiers.

FIG. 26A illustrates an example embodiment of a present disclosure.

FIG. 26B illustrates an example embodiment of a present disclosure.

DETAILED DESCRIPTION OF EXAMPLES

Example embodiments of the present invention enable implementation of enhanced features and functionalities in 4G/5G systems. Embodiments of the technology disclosed herein may be employed in the technical field of 4G/5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

The following acronyms are used throughout the present disclosure:

5G 5th generation mobile networks
5GC 5G Core Network
5GS 5G System

Figure 1:
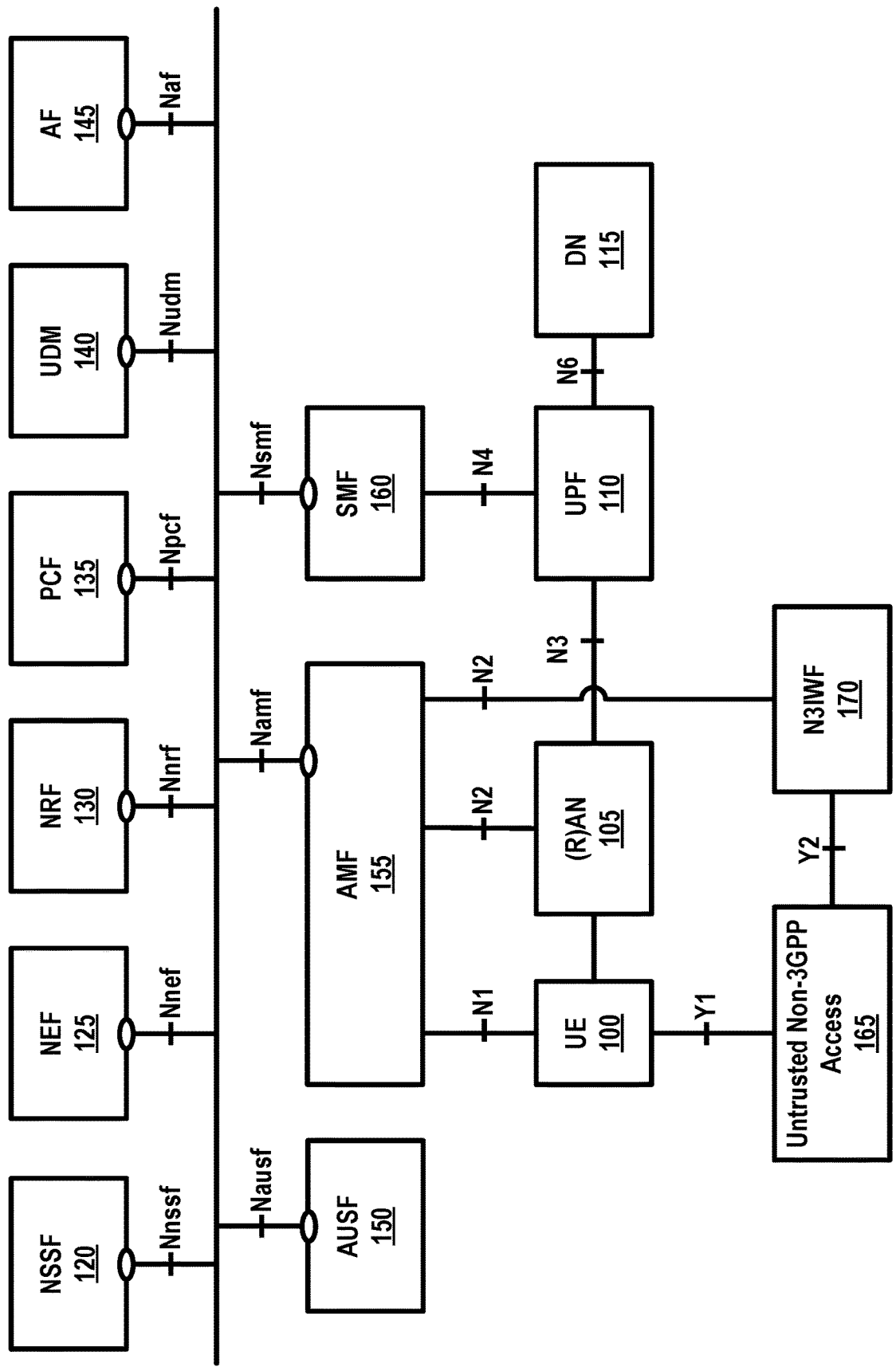
FIG. 1 is a diagram of an example 5G system architecture as per an aspect of an embodiment of the present disclosure.
Figure 2:
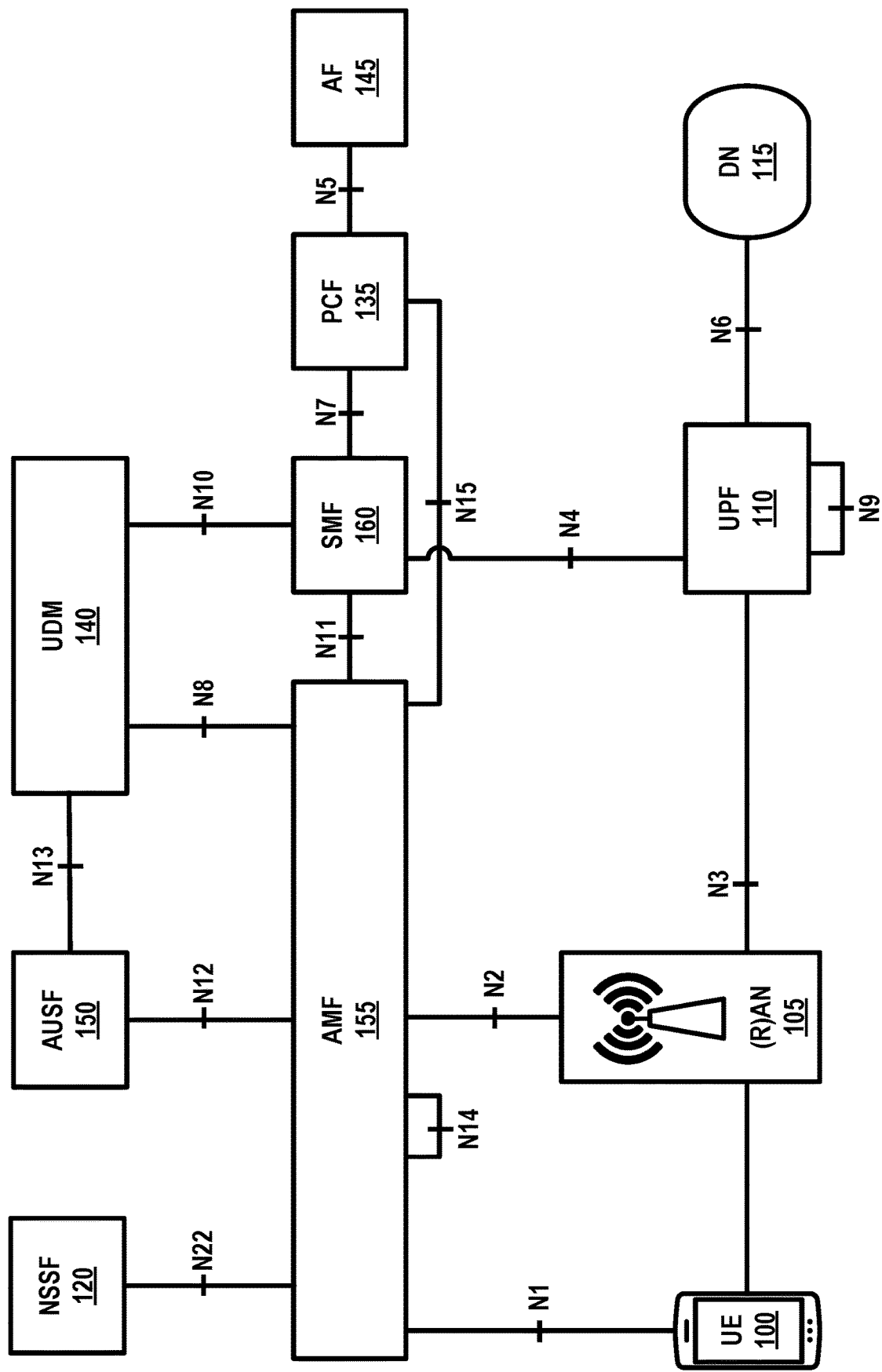
FIG. 2 is a diagram of an example 5G System architecture as per an aspect of an embodiment of the present disclosure.

5G-AN 5G Access Network
5QI 5G QoS Indicator
ACK Acknowledgement
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
DRX Discontinuous Reception
F-TEID Fully Qualified TEID
gNB next generation Node B
GPSI Generic Public Subscription Identifier
GTP GPRS Tunneling Protocol
GUTI Globally Unique Temporary Identifier
HPLMN Home Public Land Mobile Network
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
PRACH Physical Random Access CHannel
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SI System Information
SIB System Information Block
SMF Session Management Function
SMSF SMS Function
S-NSSAI Single Network Slice Selection Assistance information
SUCI Served User Correlation ID
SUPI Subscriber Permanent Identifier
TEID Tunnel Endpoint Identifier UE User Equipment
UL Uplink
UL CL Uplink Classifier
UPF User Plane Function
VPLMN Visited Public Land Mobile Network Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
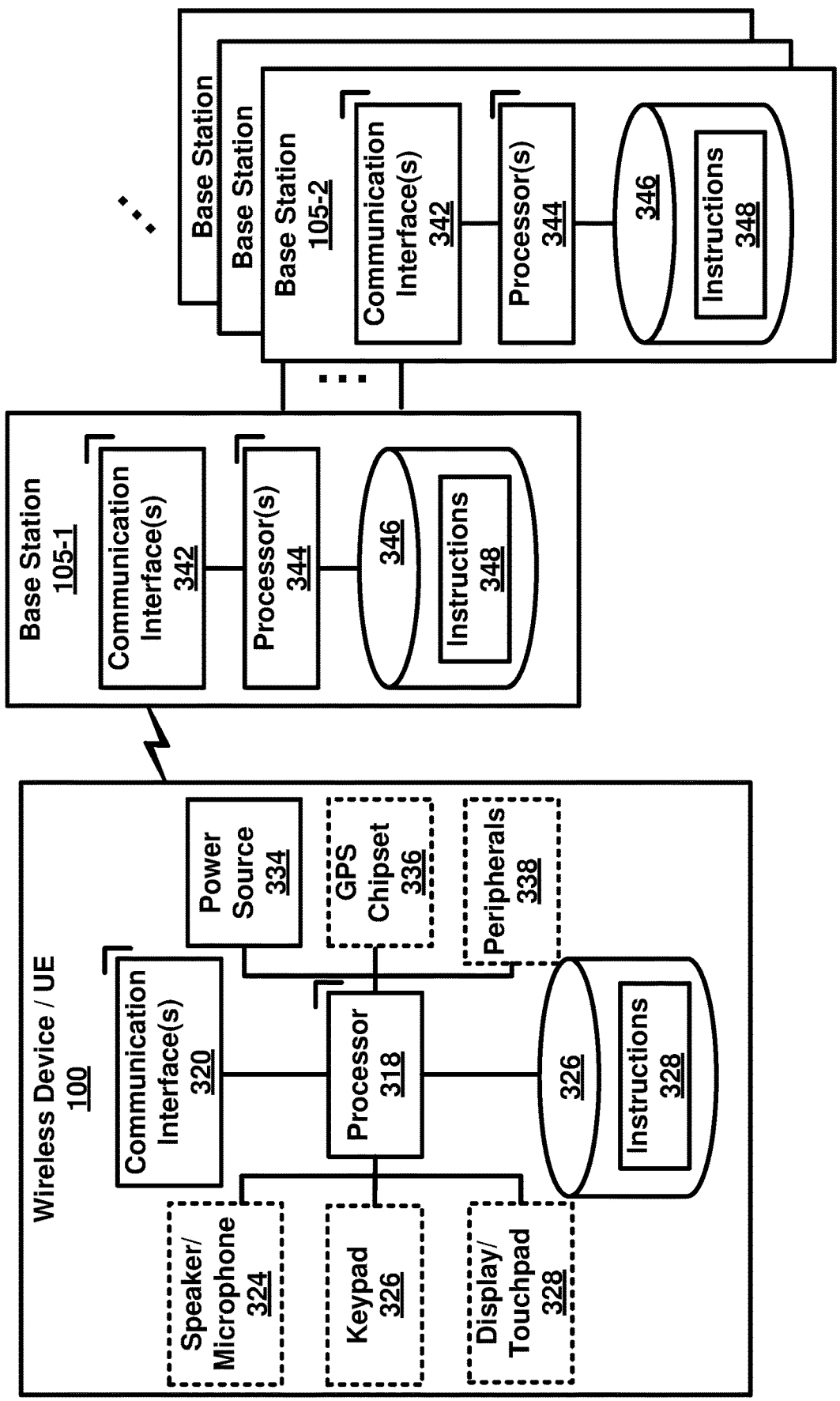
FIG. 3 is a system diagram of an example wireless device and a network node in a 5G system as per an aspect of an embodiment of the present disclosure.
Figure 4:
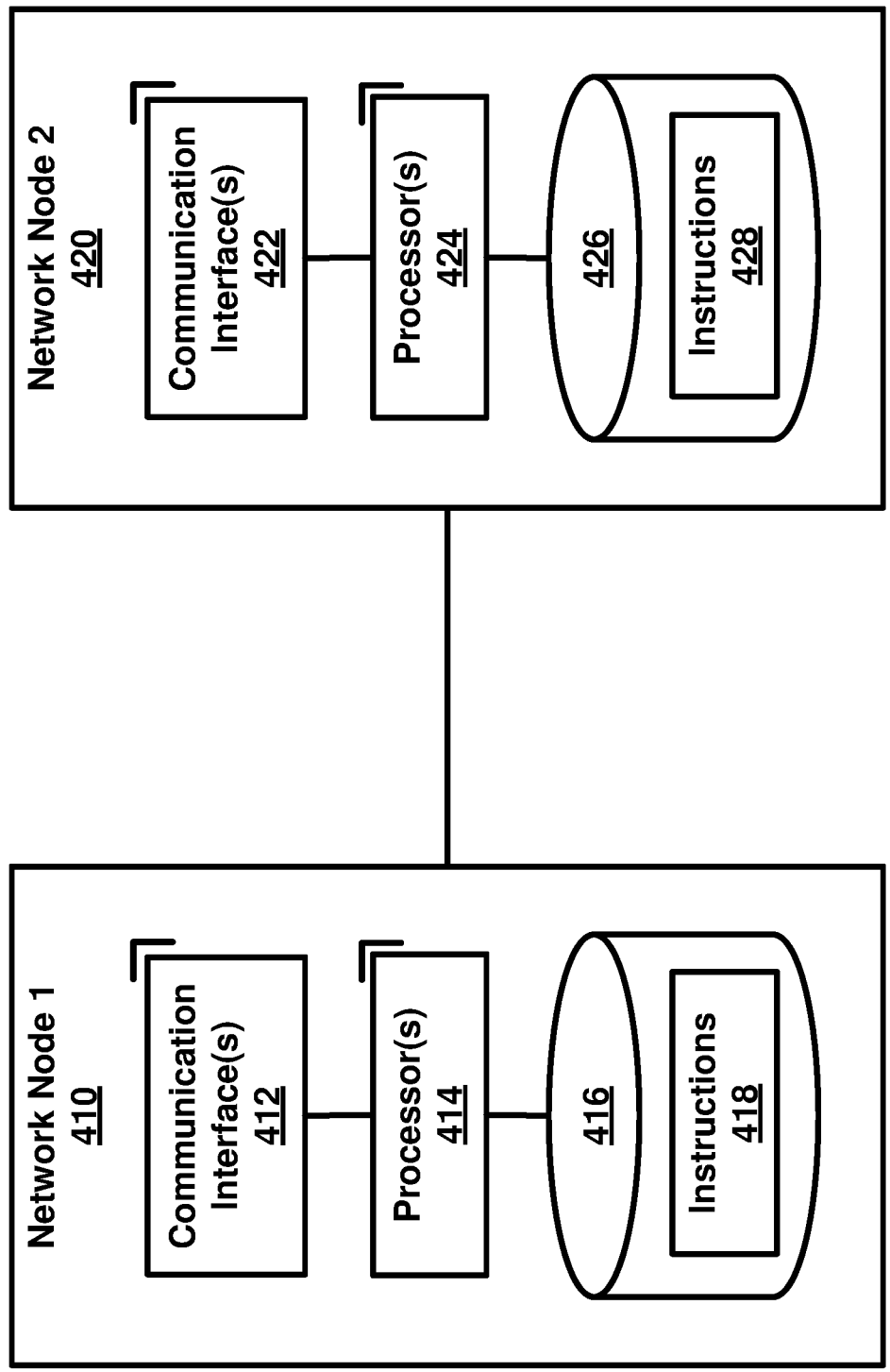
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function (AF), AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
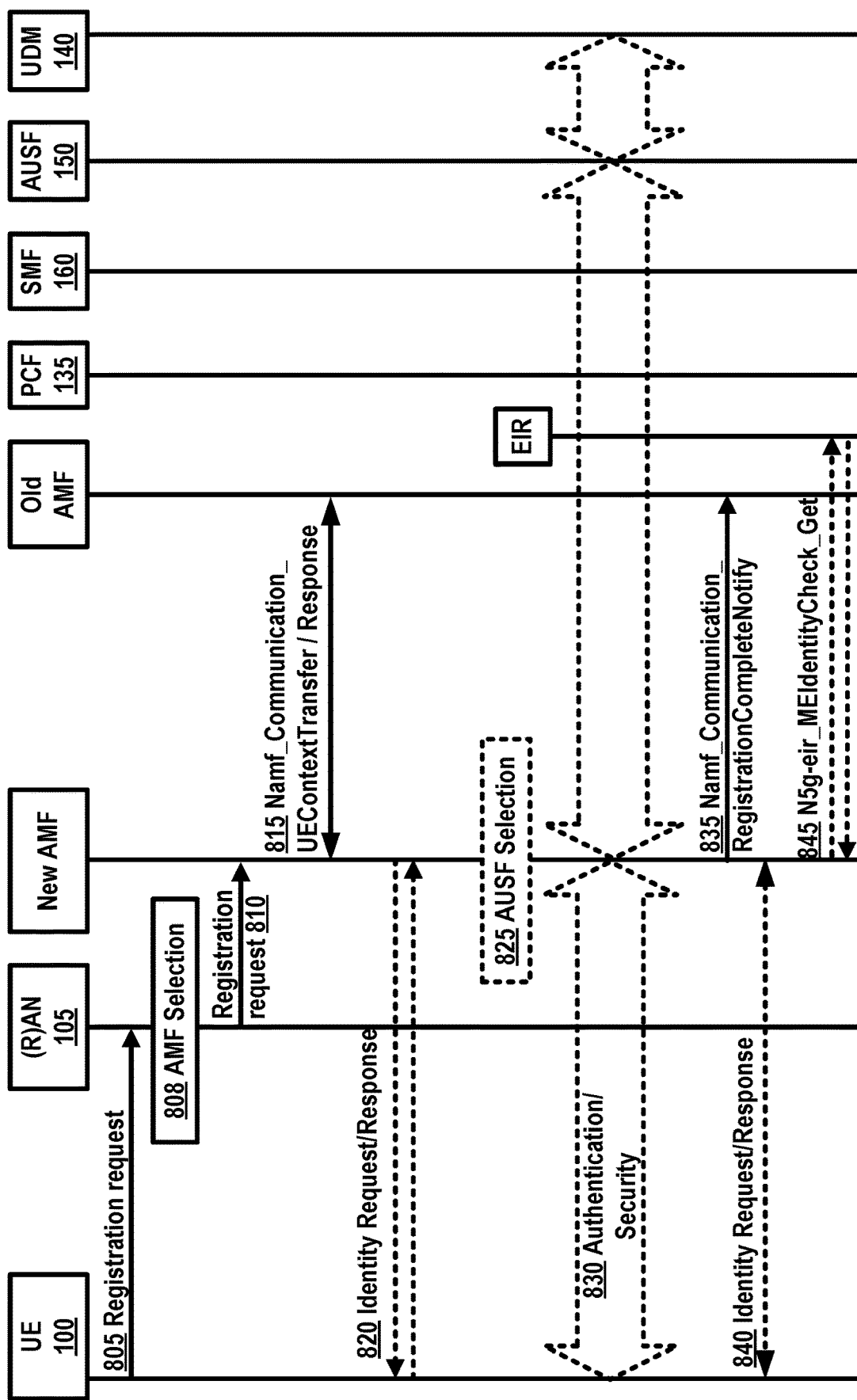
FIG. 8 is an example call flow as per an aspect of an embodiment of the present disclosure.
Figure 9:
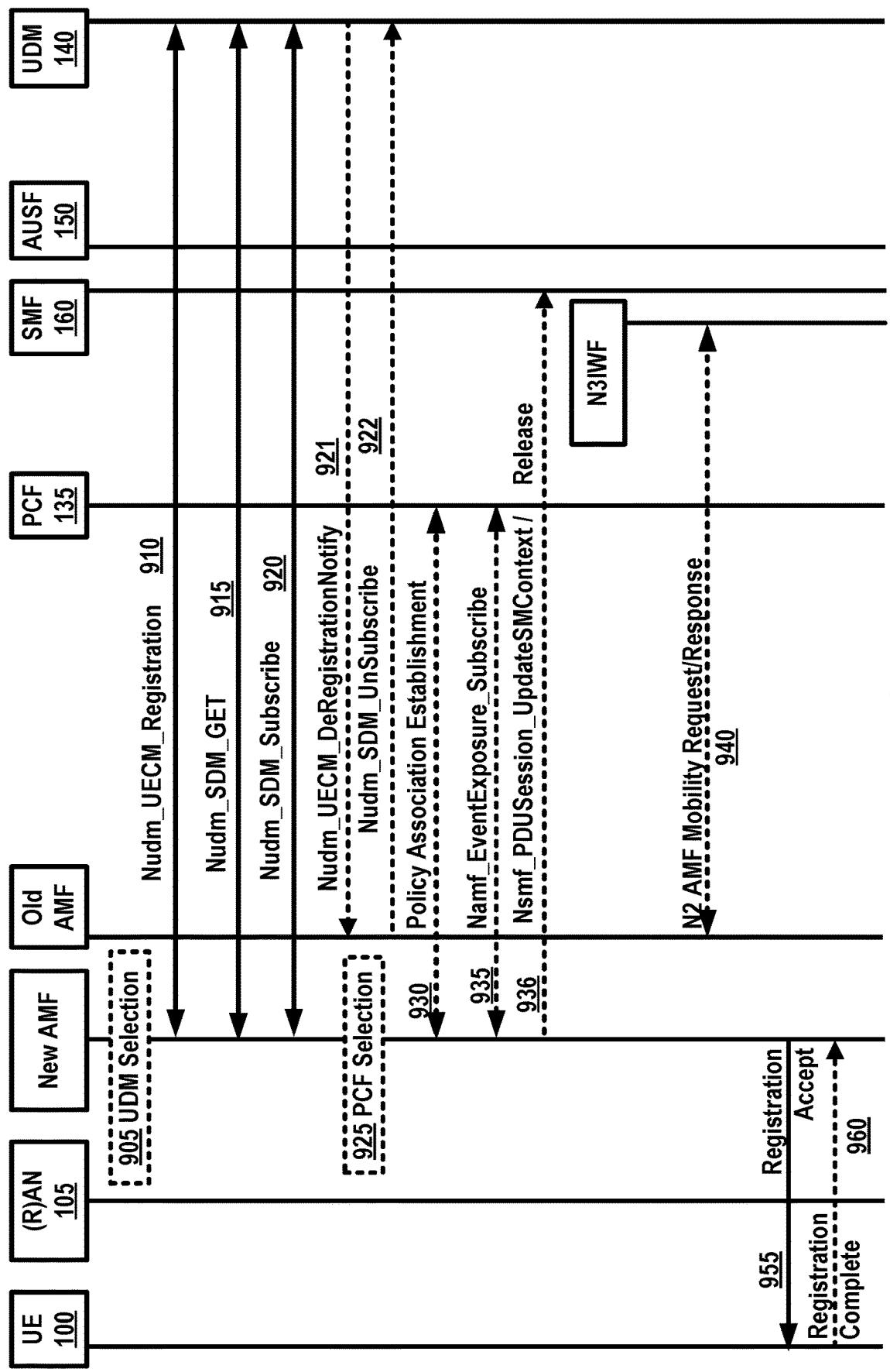
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figure 6A:
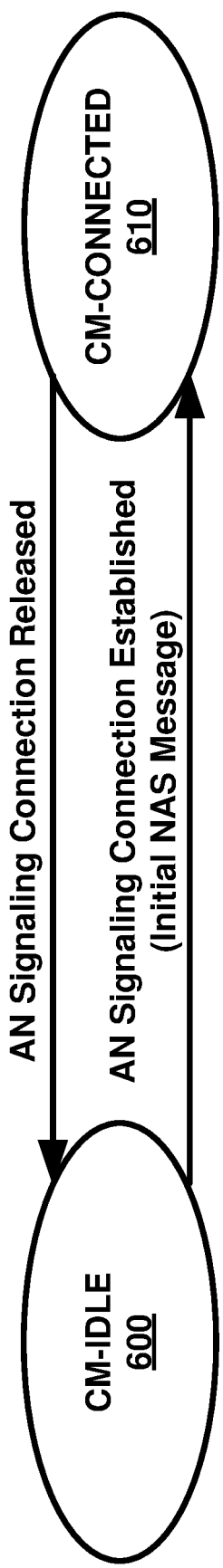
FIG. 6A and FIG. 6B depict two connection management state models in UE 100 and AMF 155 as per an aspect of embodiments of the present disclosure.
Figure 6B:
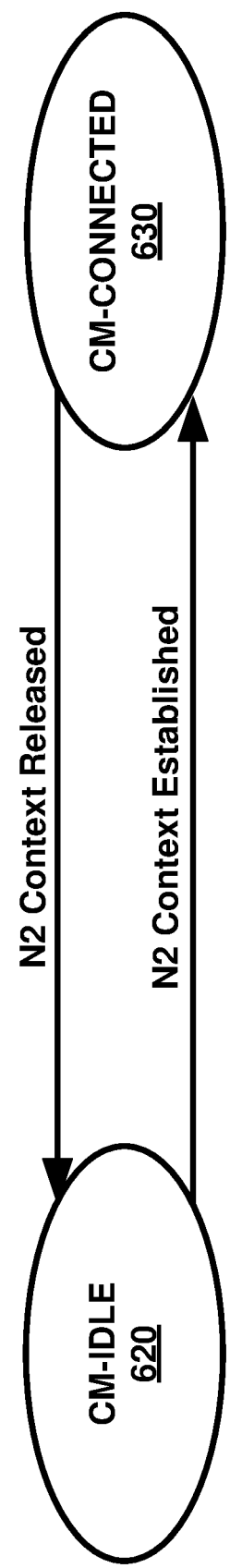

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
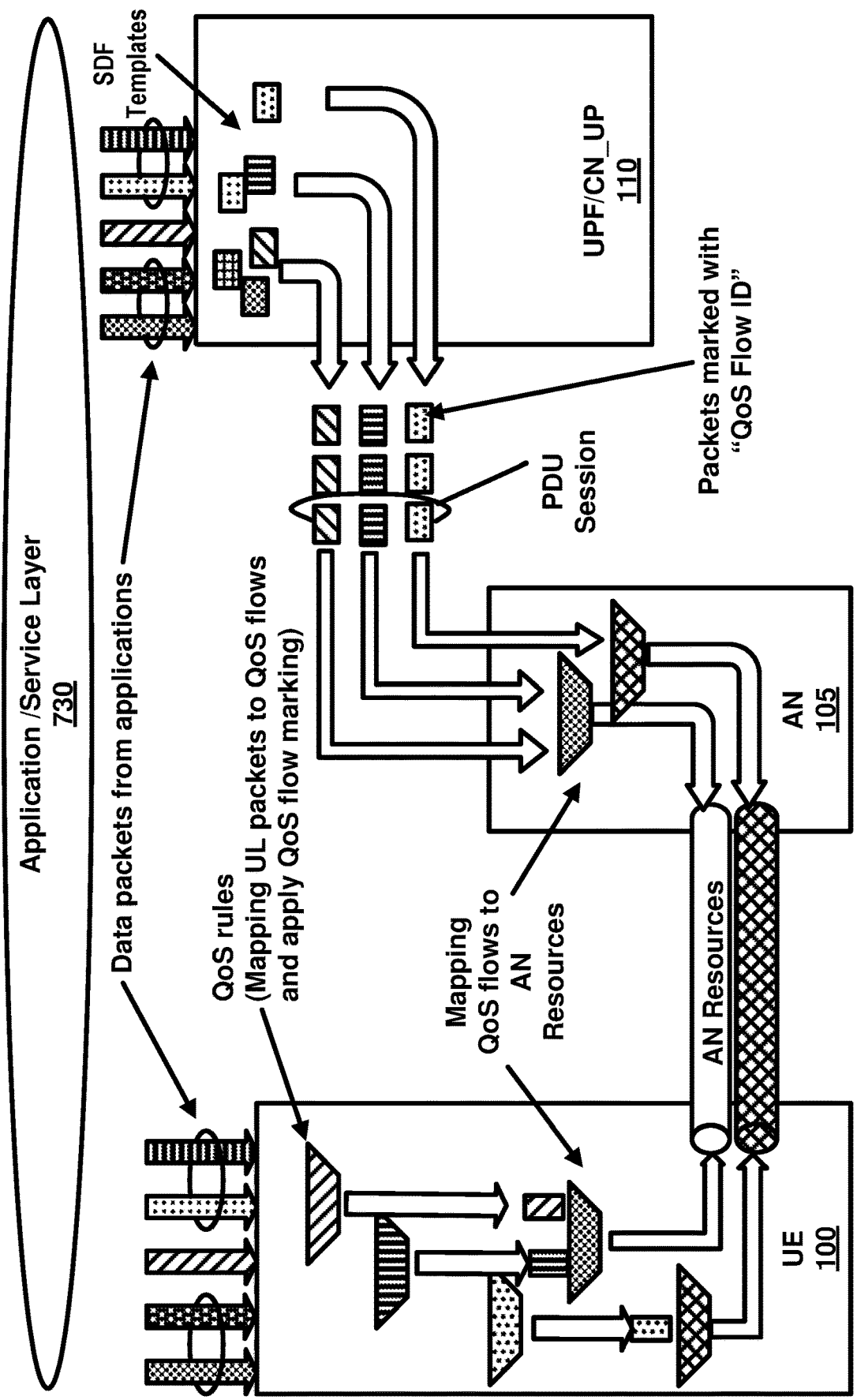
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (e.g. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (e.g., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (e.g. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 a Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure.

If the new AMF 155 contacts the PCF 135 identified by the (V-)PCF ID received during inter-AMF 155 mobility, the new AMF 155 may include the PCF-ID in the Npcf_AM-PolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_Event-Exposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160 (s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
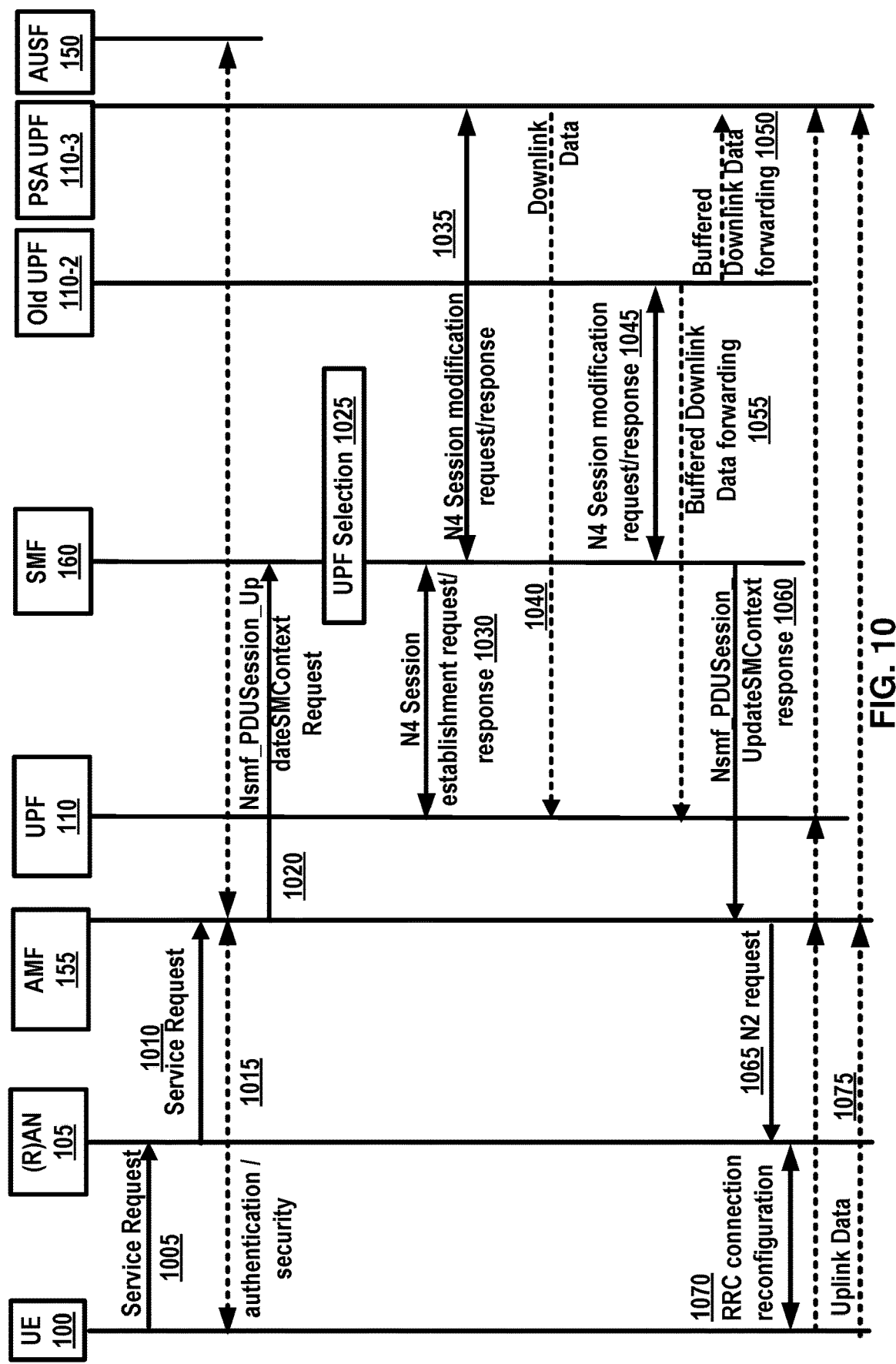
FIG. 10 is an example call flow as per an aspect of an embodiment of the present disclosure.
Figure 11:
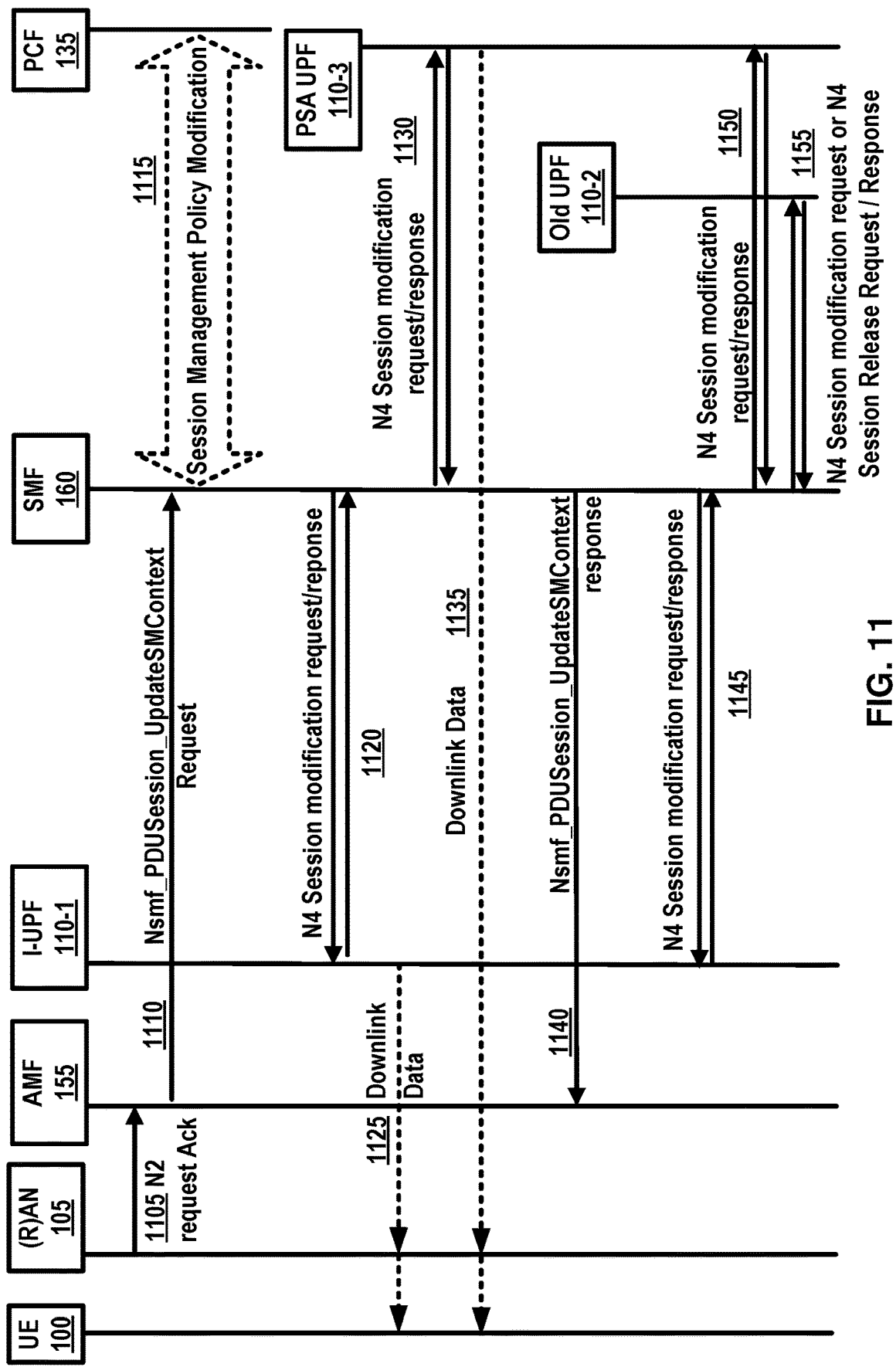
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send a Nsmf_PDUSession_UpdateSMContext request to SMF 160(s) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (e.g. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105.

In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, a Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
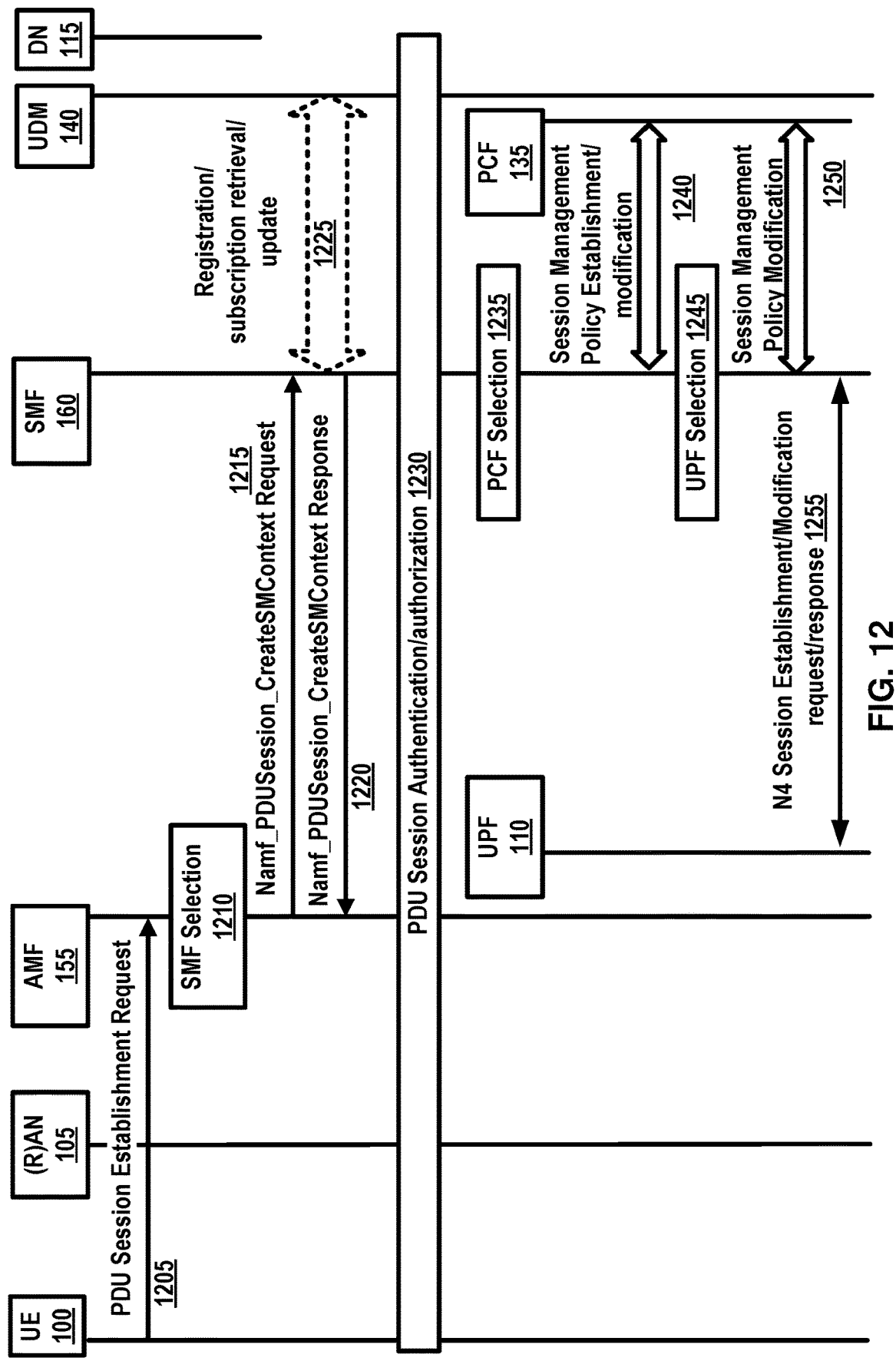
FIG. 12 is an example call flow as per an aspect of an embodiment of the present disclosure.
Figure 13:
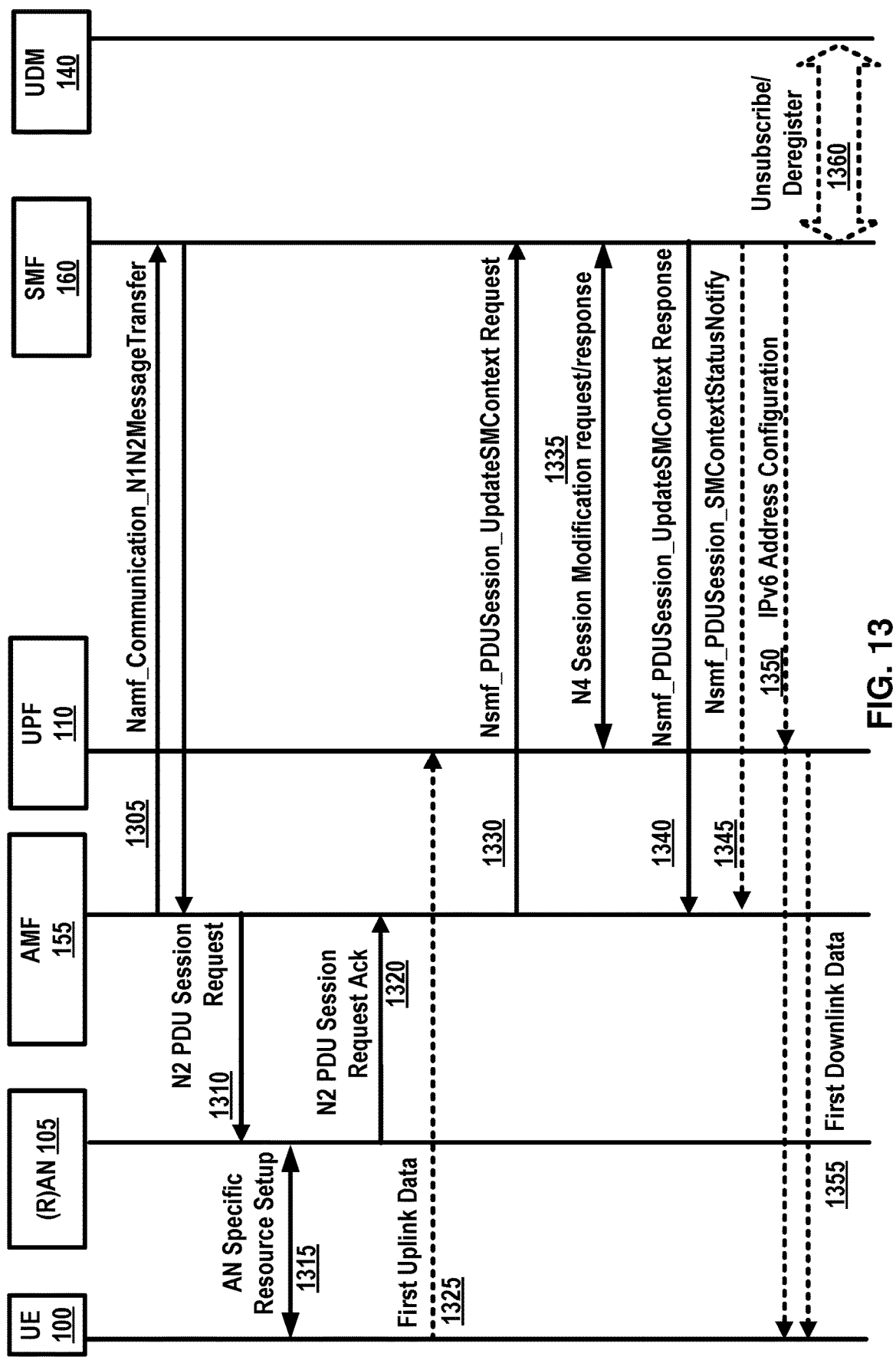
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 a Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
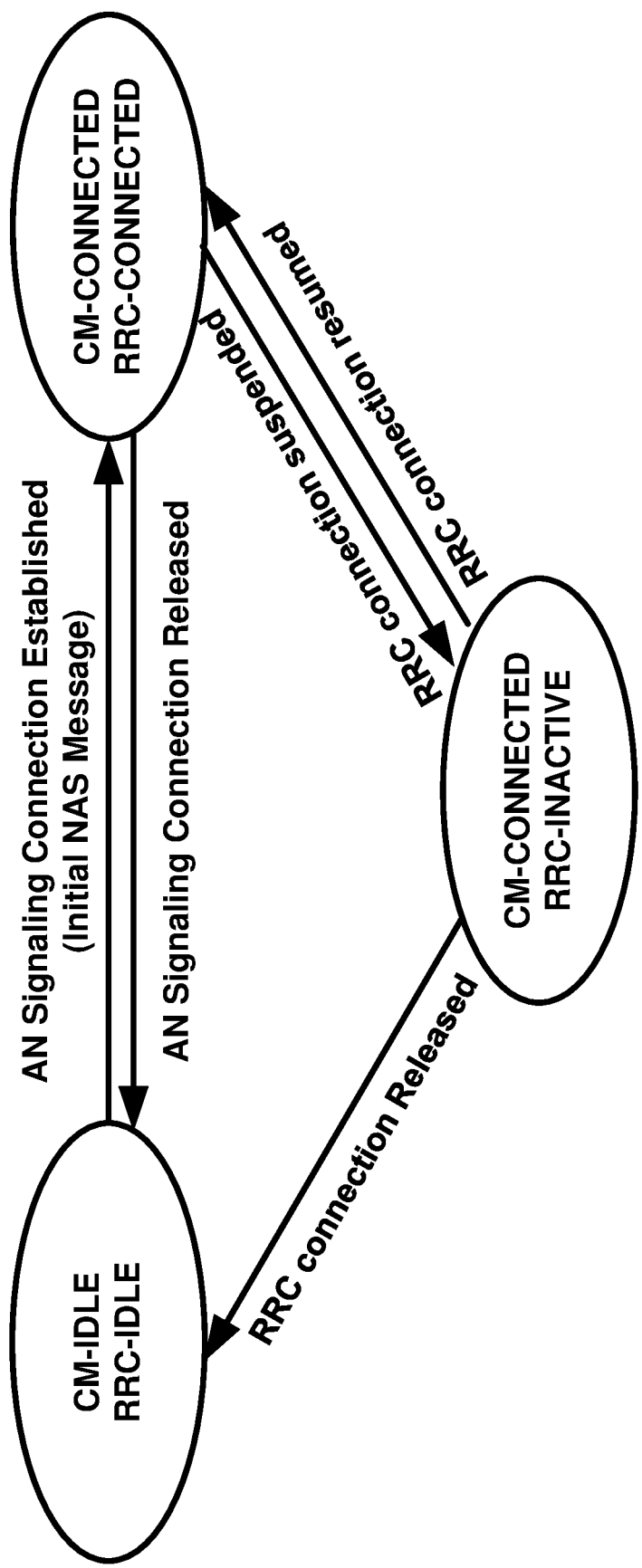
FIG. 14 is an example radio resource control (RRC) state transition aspect as per an aspect of an embodiment of the present disclosure.

As depicted in FIG. 14, a connection management (CM) state may be related to a radio resource control (RRC) state. RRC-INACTIVE (e.g. RRC inactive) may be a state where a UE (e.g. a wireless device, device) remains in CM-CONNECTED (e.g. CM connected). In an example, the UE may move within an area configured by a RAN (e.g. NG-RAN), referred to as a RAN notification area (RNA), without notifying the RAN. In RRC_INACTIVE state, the last base station (e.g., gNB) of a RAN to serve the UE may keep the UE context and the UE-associated connection with the serving AMF and UPF (e.g. N2 connection, N3 connection). In an example, a UE in CM-IDLE may be in RRC-IDLE. In an example, a UE in CM-CONNECTED may be in RRC-CONNECTED. The mobility behavior of the UE in RRC-INACTIVE may be similar with RRC-IDLE state behavior (e.g. cell reselection based on serving cell quality, paging monitoring, periodic system information acquisition) and may apply different parameter for RRC-IDLE and RRC-INACTIVE.

Figure 15:
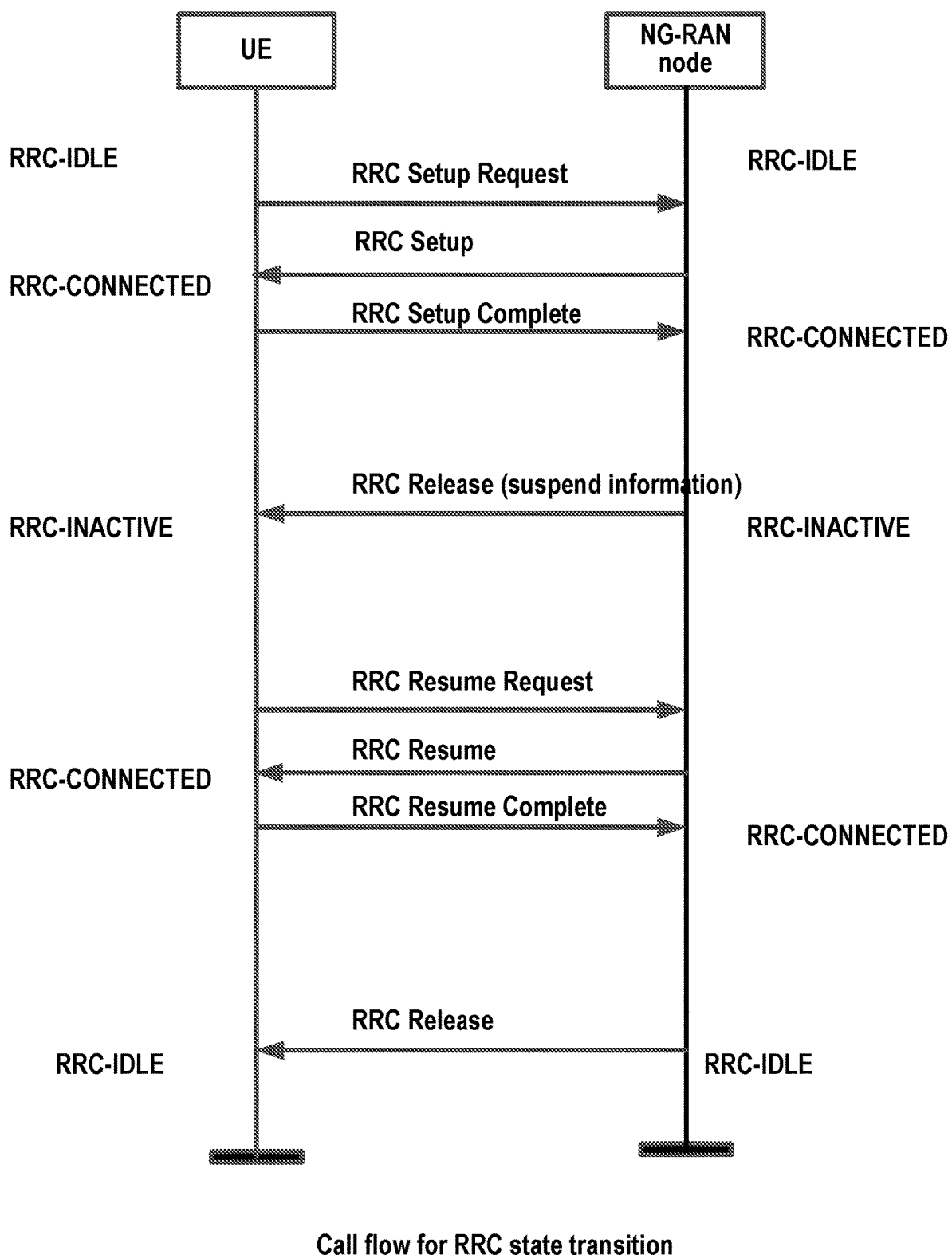
FIG. 15 is an example call flow for RRC state transaction as per an aspect of an embodiment of the present disclosure.

FIG. 15 illustrates an example call flow for four RRC state transitions in accordance with embodiments of the present disclosure. The four RRC state transitions include: RRC-IDLE to RRC-CONNECTED; RRC-CONNECTED to RRC-INACTIVE; RRC-INACTIVE to RRC-CONNECTED; and RRC_CONNECTED to RRC-IDLE. It should be noted that, although the four RRC state transitions are shown as part of a single call flow diagram, each RRC state transition call flow can be performed independently from each other.

Starting with the RRC state transition from RRC-IDLE to RRC-CONNECTED, a UE in RRC-IDLE may send an RRC setup request message to an NG-RAN node (e.g., a gNB) to request RRC connection setup with the NG-RAN. The UE may receive an RRC setup message from the NG-RAN node in response to the RRC setup request message. The UE may transition from the RRC-IDLE to RRC-CONNECTED in response to the RRC setup message from the NG-RAN node. The RRC state maintained at the UE may be updated to reflect that the current RRC state of the UE is RRC-CONNECTED after the state transition. The UE may respond to the RRC setup message by sending an RRC setup complete message to the NG-RAN. The RRC state maintained at the NG-RAN node may be updated to reflect that the current RRC state of the UE is RRC-CONNECTED after receiving the RRC setup complete message.

For the RRC state transition from RRC-CONNECTED to RRC-INACTIVE, the NG-RAN node may send an RRC release message to the UE to request suspension of an RRC connection. In an example, the RRC release message may include suspend information that indicates to the UE that the RRC release message is for suspending instead of releasing the RRC connection. The suspend information may comprise a radio network temporary identity (RNTI) value, a radio access network (RAN) paging cycle, RAN notification area information, and/or the like. The UE may transition from RRC-CONNECTED to RRC-INACTIVE in response to the RRC release message from the NG-RAN node. The RRC state maintained at both the UE and the NG-RAN node may be updated to reflect that the current RRC state of the UE is RRC-INACTIVE.

For the RRC state transition from RRC-INACTIVE to RRC-CONNECTED, the UE may send an RRC resume request message to the NG-RAN node to request that the suspended RRC connection be resumed. The UE may receive an RRC resume message from the NG-RAN node in response to the RRC resume request message. In response to the RRC resume message from the NG-RAN node, the UE may transition from RRC-INANCTIVE to RRC-CONNECTED state and may send an RRC resume complete message to the NG-RAN node. The RRC state maintained at the UE may be updated to reflect that the current RRC state of the UE is RRC-CONNECTED after the state transition. The RRC state maintained at the NG-RAN node may be updated to reflect that the current RRC state of the UE is RRC-CONNECTED after receiving the RRC resume complete message from the UE.

Finally, for the RRC state transition from RRC-CONNECTED to RRC-IDLE, the NG-RAN node may send an RRC release message to the UE to request that the RRC connection be released. The UE may transition from RRC-CONNECTED to RRC-IDLE after receiving RRC release message from the NG-RAN node. The RRC state maintained at both the UE and the NG-RAN node may be updated to reflect that the current RRC state of the UE is RRC-IDLE.

In an example, a unique international mobile subscription identity (IMSI), as shown in FIG. 21A, is a permanent UE identity and may be allocated and used in GSM/UMTS/EPS system. In an example, subscription permanent identity (SUPI) may be a globally unique UE identity to each subscriber in a 5G system and SUPI may be the IMSI.

In an example, a globally unique temporary UE identity (GUTI) may be to provide an unambiguous identification of a UE that does not reveal the IMSI in evolved packet system (EPS) and may be used for an MME and a network.

In an example, a fifth generation globally unique temporary UE identity (5G-GUTI) may be to provide an unambiguous identification of a UE that does not reveal the UE's permanent identity in 5G system (5GS) and may be used for an AMF and a network.

FIG. 21B depicts an example structure of an EPS/4G UE identifiers. In an example, mobile country code (MCC) may be consisted of three digits and may identify uniquely the country of domicile of the mobile subscription. In an example, mobile network code (MNC) may be consisted of two or three digits for 3GPP network application and the MNC may identify the home PLMN of the mobile subscription. In an example, the GUTI may be constructed from a globally unique MME identifier (GUMMEI) and M-TMSI. In an example, the GUMMEI may be constructed from the MCC, MNC and MME identifier (MMEI). In an example, MME code (MMEC) may be unique within the MME pool area and M-TMSI. In an example, a UE may be identified by a M-TMSI within a MME. In an example, S-TMSI may be shortened from of the GUTI to enable more efficient radio signaling procedure (e.g. paging and service request). The S-TMSI may be constructed from the MMEC and the M-TMSI.

FIG. 21C depicts an example structure of a 5G UE identifiers. In an example, mobile country code (MCC) may be consisted of three digits and may identify uniquely the country of domicile of the mobile subscription. In an example, mobile network code (MNC) may be consisted of two or three digits for 3GPP network application and the MNC may identify the home PLMN of the mobile subscription. In an example, the 5G-GUTI may be constructed from a globally unique AMF identifier (GUAMI) and 5G-TMSI. In an example, the GUAMI may be constructed from the MCC, MNC and AMF identifier (AMFI). In an example, the AMFI may be constructed from an AMF Region ID, an AMF Set ID and an AMF Pointer. The AMF Region ID may identity the region, the AMF Set ID may uniquely identity the AMF Set within the AMF region, and the AMF Pointer may identity one or more AMFs within the AMF Set. In an example, 5G-S-TMSI may be shortened form of the 5G-GUTI and the 5G-S-TMSI may be used to efficient radio signaling procedures (e.g. paging and Service Request).

Figure 16:
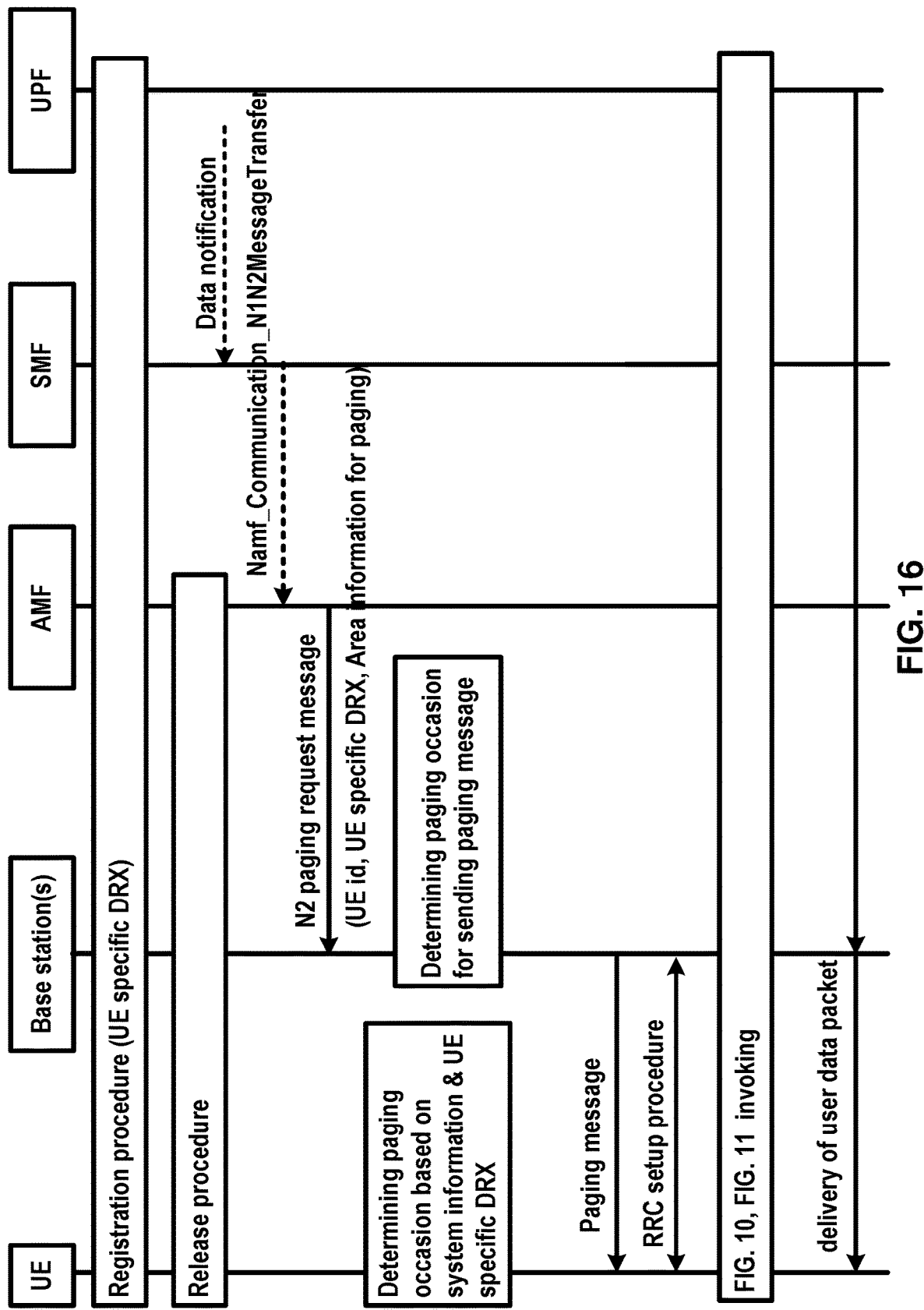
FIG. 16 is an example call flows of paging procedure for a UE in CM-IDLE state

FIG. 16 illustrates a paging procedure from an AMF. In an example, a UE and an AMF may negotiate a UE specific DRX cycle via a registration procedure. In an example, radio connection and N2/N3 connection of the UE may be released and the UE may transition into CM-IDLE state. If there is a terminating call towards a UE in CM-IDLE state, the AMF may send paging messages over the N2 interface to relevant base stations (gNBs/eNBs) belonging to the tracking areas at which the UE is expected to be placed. In an example, a UPF may receive downlink data for a PDU session and there is no AN Tunnel info stored in the UPF for the PDU Session. The UPF may send a data notification message to a SMF in response to receiving the downlink data, requesting a user plane connection setup for the PDU session with the UE. In an example, the SMF may send a communication request message to the AMF in response to receiving the data notification from the UPF, requesting a communication setup with the UE. The communication request message may be a Namf_Communication_N1N2MessageTransfer. In an example, the communication request message may comprise UE identity, PDU session identity, session management container, QFI, QoS profile, 5QI, ARP, PPI, N1 message and/or the like. In an example, the paging message may comprise a paging identity of the paged UE and tracking areas for which the paged UE is expected to be located. In an example, the paging message may be N2 paging request message. The paging identity may indicate the UE identity represented in the form of either an 5G-TMSI/S-TMSI or IMSI. In an example, the base station(s) may perform paging of the UE over the radio interface (e.g. Uu interface) by sending paging messages on the cells belonging to the tracking areas indicted in the N2 paging message. In an example, the paging message may comprise a list of paging records, where each paging record contains the paging identity of the paged UE.

Figure 18:
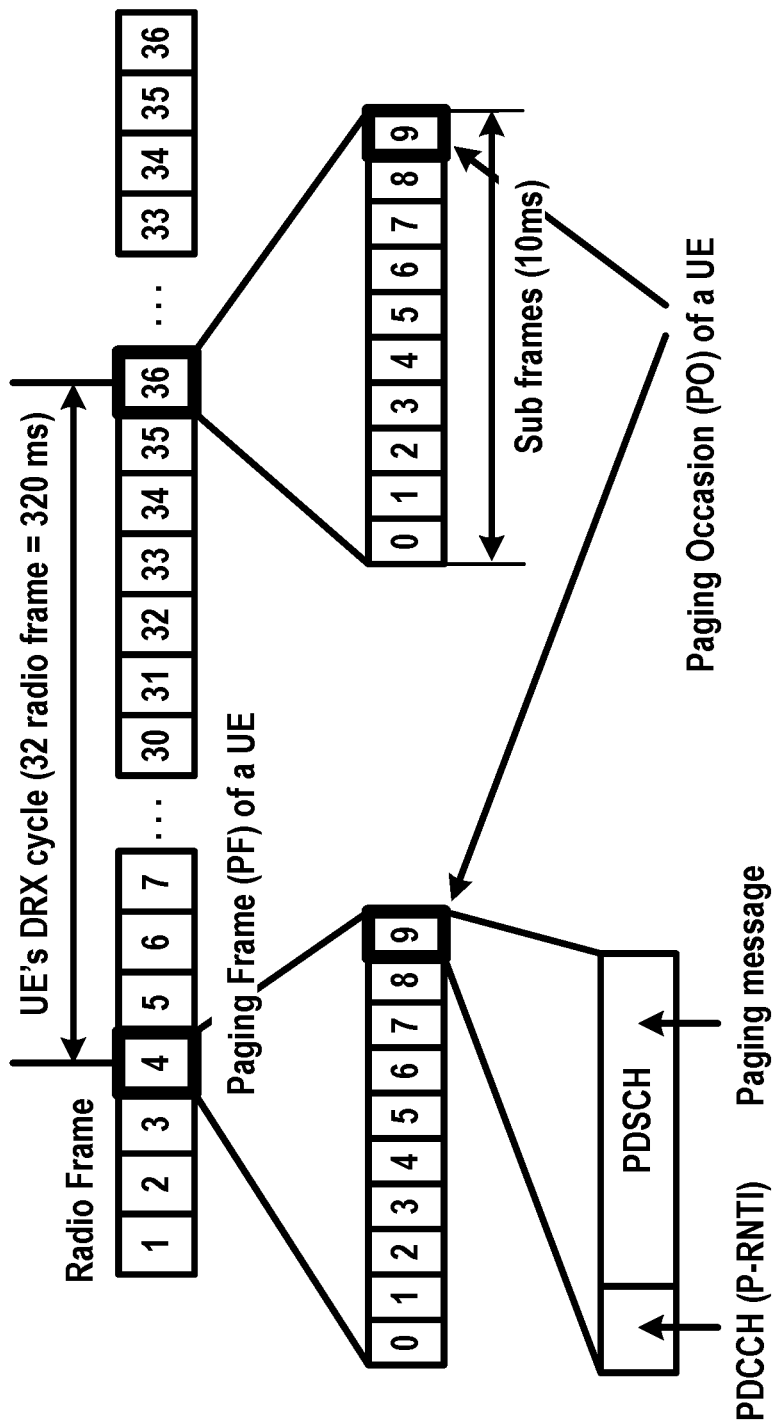
FIG. 18 is an example radio frame structure for paging monitoring occasion.

From the UE side, to receive the paging message, the UE in CM-IDLE state may be required to monitor a physical control channel, referred to as a physical downlink control channel (PDCCH), masked by the paging-radio network temporary identity (P-RNTI), addressing the paging message, as shown in FIG. 18. In an example, the UE may monitor the PDCCH on particular paging occasions (PO) for paging reception. The subframes where the paging message may be transmitted to the UE is defined by the paging frame (PF) and the paging occasion (PO) within the PF, as depicted in FIG. 18. The PF may comprise one or more PO(s). The allocation PO(s) may be by utilizing the IMSI or 5G-S-TMSI of the paged UEs such that the POs allocated to different UEs. A UE is in CM-IDLE state may use DRX operation and it may need to monitor at least one PO during a paging DRX cycle.

When decoding the paging message, the UE may consider that it is being paged if its UE identity exists in the paging records(s). In an example, the UE may ignore a paging message that does not include its UE identity unless the paging message is used for other purposes, for example, system information change notification. In an example, the DRX interval may be 0.32 s, 0.42s, 1.28s, 2.56s and/or the like.

FIG. 19A shows example DRX parameters of a UE for PF and PO for paging monitoring occasion calculation. A UE specific DRX cycle (i.e. Tue) may be configured in the UE and provided by the UE during registration procedure to an AMF. In an example, the AMF may provide the UE specific DRX cycle for paging procedure to a base station. A cell specific DRX cycle (i.e. Tc) may be configured in the base station and may be broadcasted by the base station. In an example, the UE and the base station may use shortest DRX cycle among the UE specific DRX cycle and the cell specific DRX cycle for a DRX cycle value for paging occasion calculation.

FIG. 19B shows example input parameters for paging occasion calculation which may be used in FIG. 19C and FIG. 19D. In an example, the number of paging occasions per DRX cycle 'nB' may be configured by a base station and may be broadcasted by the base station via system information.

The Paging message from the MME/AMF may contain the S-TMSI (4G) or the 5G-S-TMSI (5G). The base station has to schedule the transmission of pages over the air, since each UE only looks for them at a configured interval (usually every 1.28 or 2.56 seconds). The S-TMSIs/5G-S-TMSIs of the UEs that may be paged at a particular time are included in the same Paging message, and the base station may allocate the necessary downlink (PDSCH) resources to carry the message; a downlink control information (DCI) in the PDCCH pointing at those resources are associated with the P-RNTI, so that the UEs recognize that a Paging message is being sent, and therefore can decode it correctly.

FIG. 19C shows an example equation to derive a system frame number (SFN) for the paging frame for LTE/4G. Paging occasion of the paging frame may be calculated using an equation i_s based on a subframe patterns in FIG. 20A and FIG. 20B. In an example, the UE_ID may be the IMSI.

FIG. 19D shows an example equation to derive a system frame number (SFN) for the paging frame for new radio (NR) (e.g. 5G). The difference of the equation for paging frame of NR (5G) comparing to LTE/4G is an introduction of new parameter PF_offset. The PF_offset may be broadcasted by a base station using system information block 1 and cell specific value. In an example, the UE_ID may be the 5G-S-TMSI.

Figure 17:
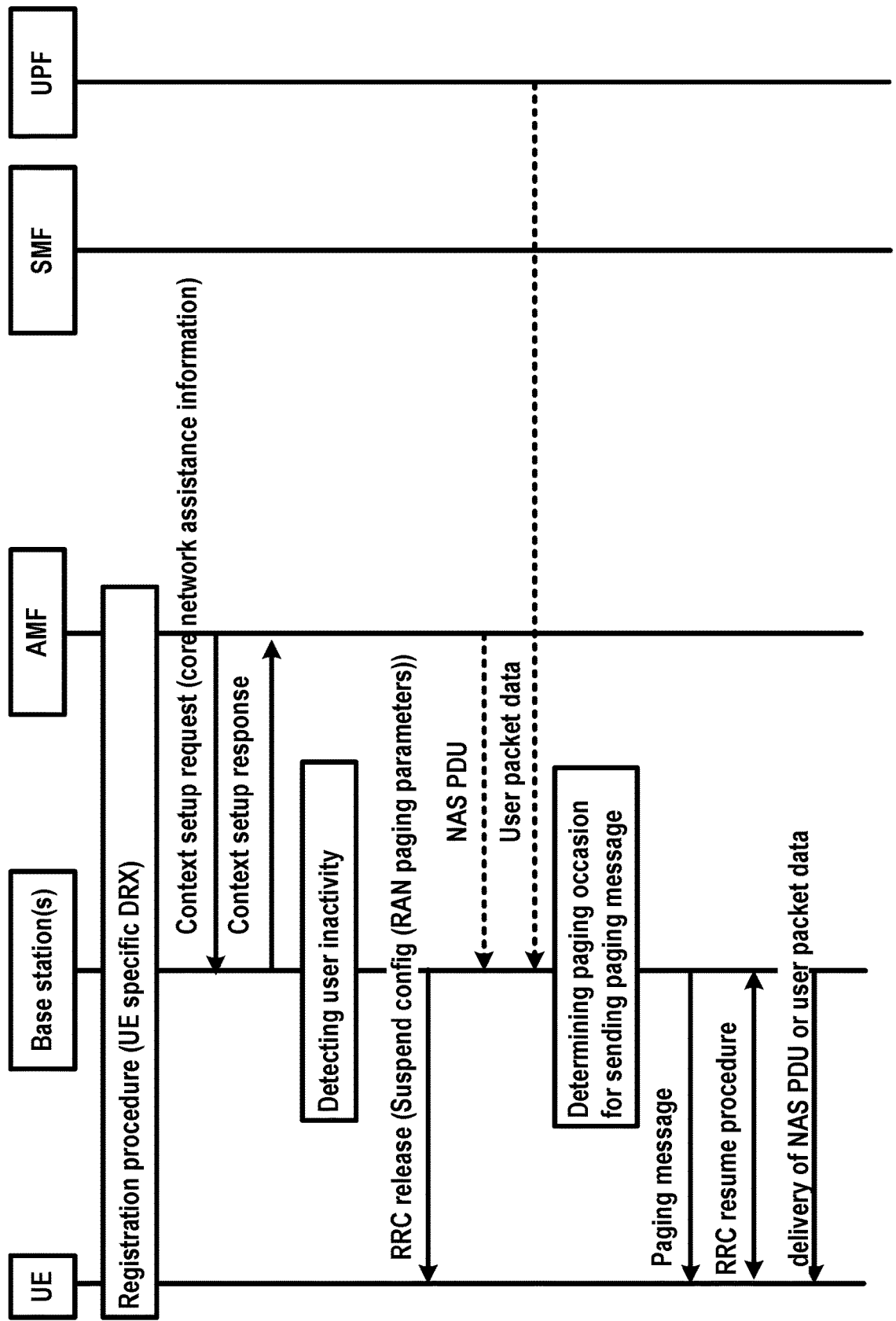
FIG. 17 is an example call flows of RAN paging procedure for a UE in RRC-INACTIVE state.

FIG. 17 illustrates a paging procedure while a UE is in RRC-INACTIVE state. In an example, a UE specific DRX cycle may be provided by the UE to the AMF during registration procedure. In an example, the AMF may provide a RAN paging related information during a context setup procedure to establish a connection setup with the UE. In an example, the AMF may send a context setup request message comprising core network assistance information. In an example, the core network assistance information may comprise a registration area of the wireless device, a parameter indicating the MICO mode is allowed for the wireless device, a periodic registration area update time value, UE specific DRX values and/or the like. In an example, the base station may send an RRC release message comprising RRC suspension/suspend configuration information in response to determining UE inactivity for a period of time (e.g. there is no transmission from or reception by the UE in 10 seconds). In an example, the suspension/suspend configuration information may comprise a radio network temporary identity (RNTI), a radio access network (RAN) paging cycle, a RAN notification area (RNA) information, a periodic RNA update time value, and/or the like. In an example, the RAN notification area information may comprise a list of cells, a PLMN identity, a list of tracking area codes, a list of RAN area code, and/or the like. In an example, the UE may perform a RAN notification area update procedure in response to entering a cell which does not belong to the RNA. In an example, the UE may perform the RAN notification area update procedure in response to entering a new RNA. In an example, the base station may determine the periodic RNA update time value based on the periodic registration area update time value. In an example, the periodic RNA update time value (e.g., 30 minutes or 1 hour) may be smaller than the periodic registration area update time value (e.g., 3 hours or 12 hours).

In an example, the base station may receive a user packet data from of a NAS PDU from core network node(s) for the UE. In an example, the base station may receive a user packet data from a UPF. In an example, the base station may receive a downlink NAS transport message comprising a NAS PDU from the AMF, as depicted in FIG. 17. In an example, the base station may send the paging message, in response to receiving the downlink PDU session information or the downlink NAS transport message. The calculation of a paging frame and paging occasion by the UE and the base station may be similar as CM-IDLE state paging procedure as described previously. The UE and the base station may use shortest DRX cycle among the RAN paging cycle value and the cell specific DRX cycle as a DRX cycle value 'T' for paging occasion calculation. The cell specific DRX cycle (i.e. Tc) may be configured in the base station and may be broadcasted by the base station. The RAN paging cycle may be provided by the base station during RRC release procedure.

Figure 22:
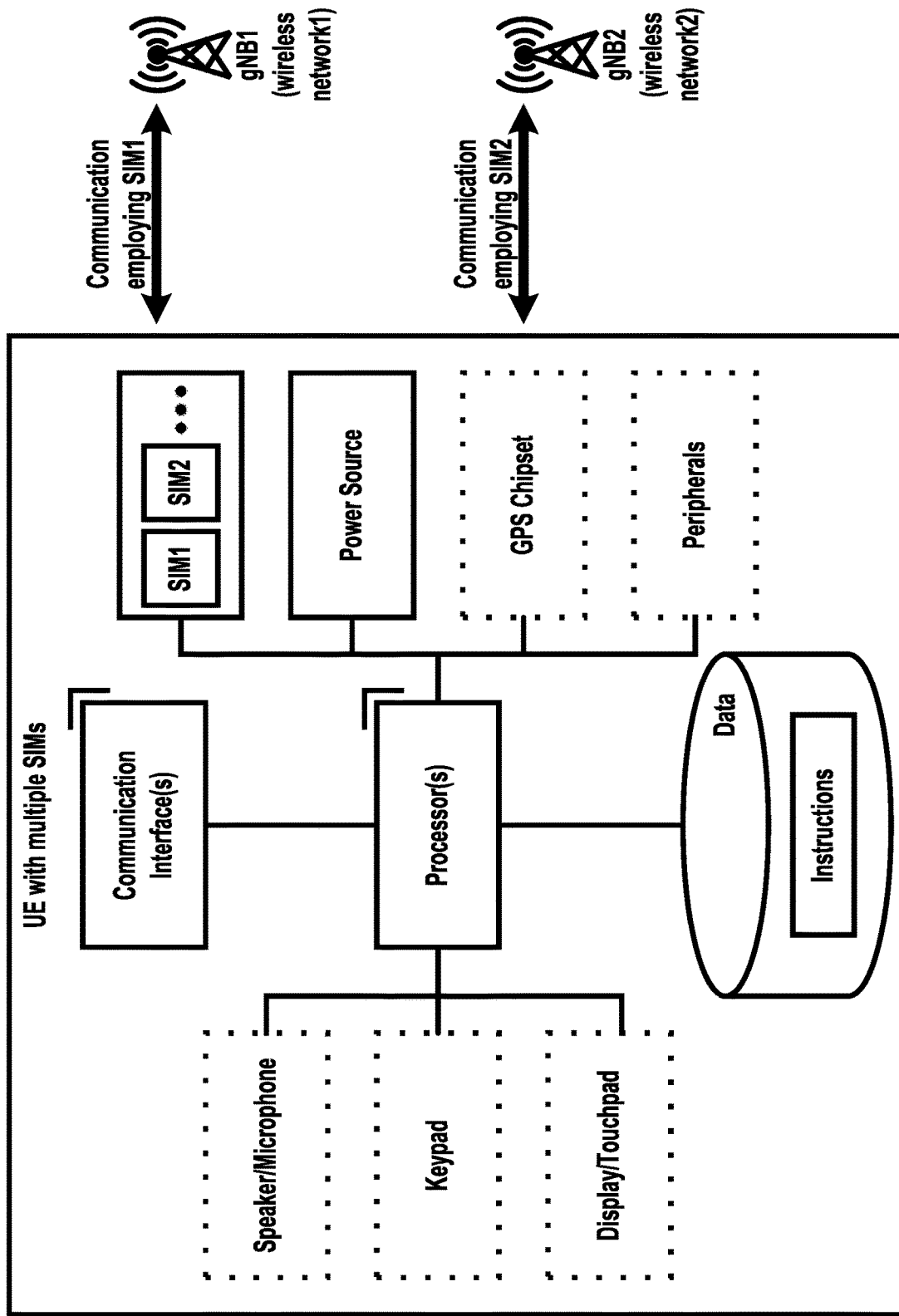
FIG. 22 is a diagram of an example multi-subscriber identity module (SIM) device architecture.

In an example, a UE may employ more than one subscriber identity module (SIM) as depicted in FIG. 22. The UE may further comprise communication interface(s), a speaker/microphone, a keypad, a display/touchpad, processor(s), a data base, a power source, a global positioning system (GPS) chipset, peripherals and/or the like. In an example, the UE may further comprise a single transmitter and one or more receivers. In an example, the UE may be a multi-SIM UE. In an example, the multi-SIM UE may be a dual-SIM UE. The UE may register to different PLMNs simultaneously and may be prepared to place and receive voice calls on both PLMN.

As depicted in FIG. 22, the UE may attempt to receive paging message from wireless network 2 employing SIM 2, during the time period of the UE is in CM-CONNECTED state to wireless network 1 employing SIM 1. The UE may create gaps on the active connection with wireless network 1 in order to monitor/listen to paging of the other connection, the wireless network 2. In an example, the UE may not be reachable by the wireless network 1 during the time period of the gap.

Figure 23:
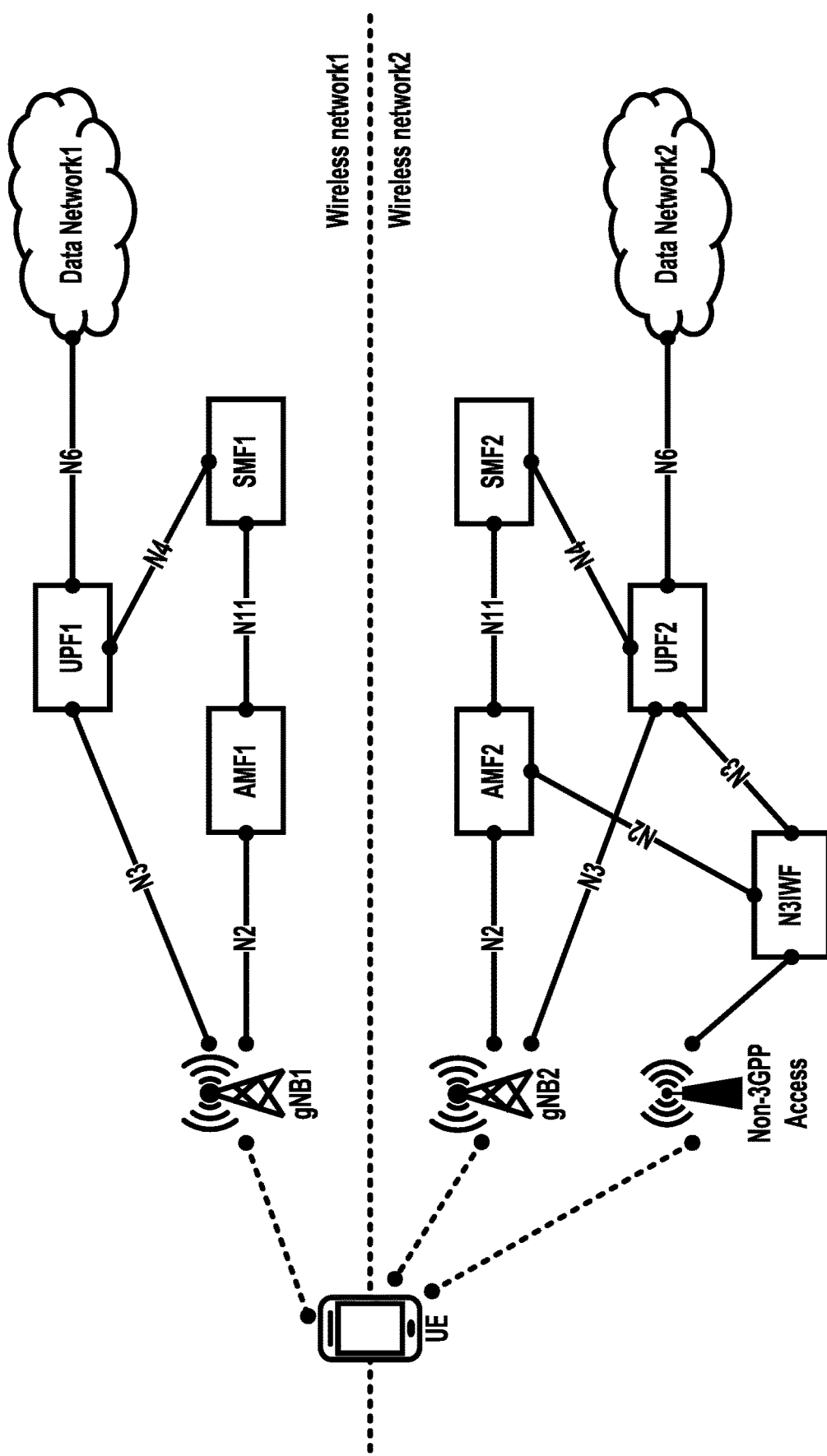
FIG. 23 is a diagram of an example 5G system architecture for dual-SIM device.
Figure 24:
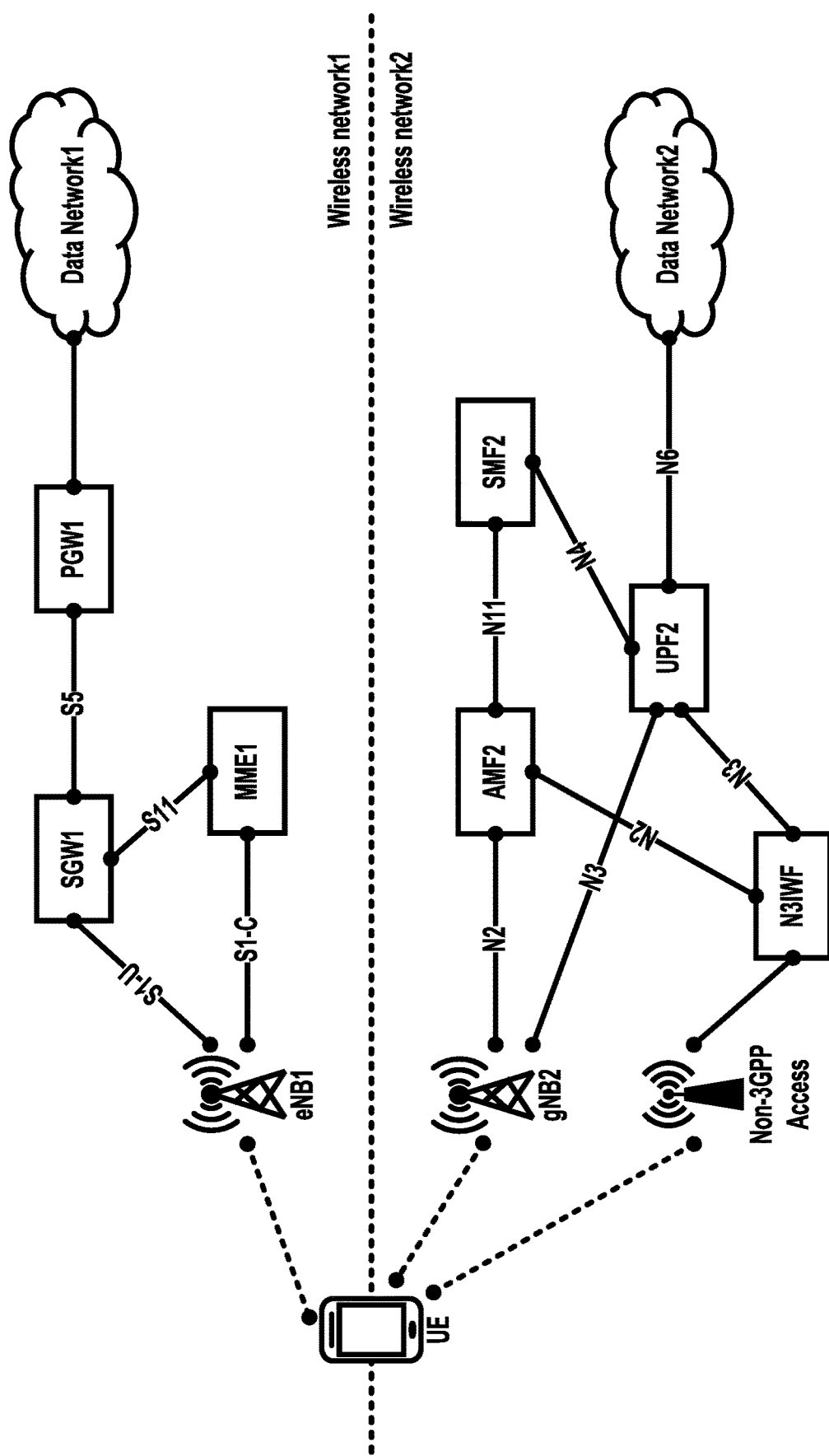
FIG. 24 is a diagram of an example 4G and 5G network architecture for dual-SIM device.

FIG. 23 and FIG. 24 illustrates an example architecture with a dual-SIM UE and two wireless networks. In an example, FIG. 23 illustrates the case that both data network/PLMN employing 5G system and FIG. 41 illustrates the case that one data network/PLMN employs 4G network and the other data network/PLMN employs 5G network.

As depicted in FIG. 23 and FIG. 24, the UE may simultaneously communicate via a non-3GPP access of wireless network 2 during a time period of that the UE actively communicate via 3GPP access of wireless network 1. In an example, the dual-SIM UE employing single transmission for 3GPP access may simultaneously activate non-3GPP transmission.

Figure 25:
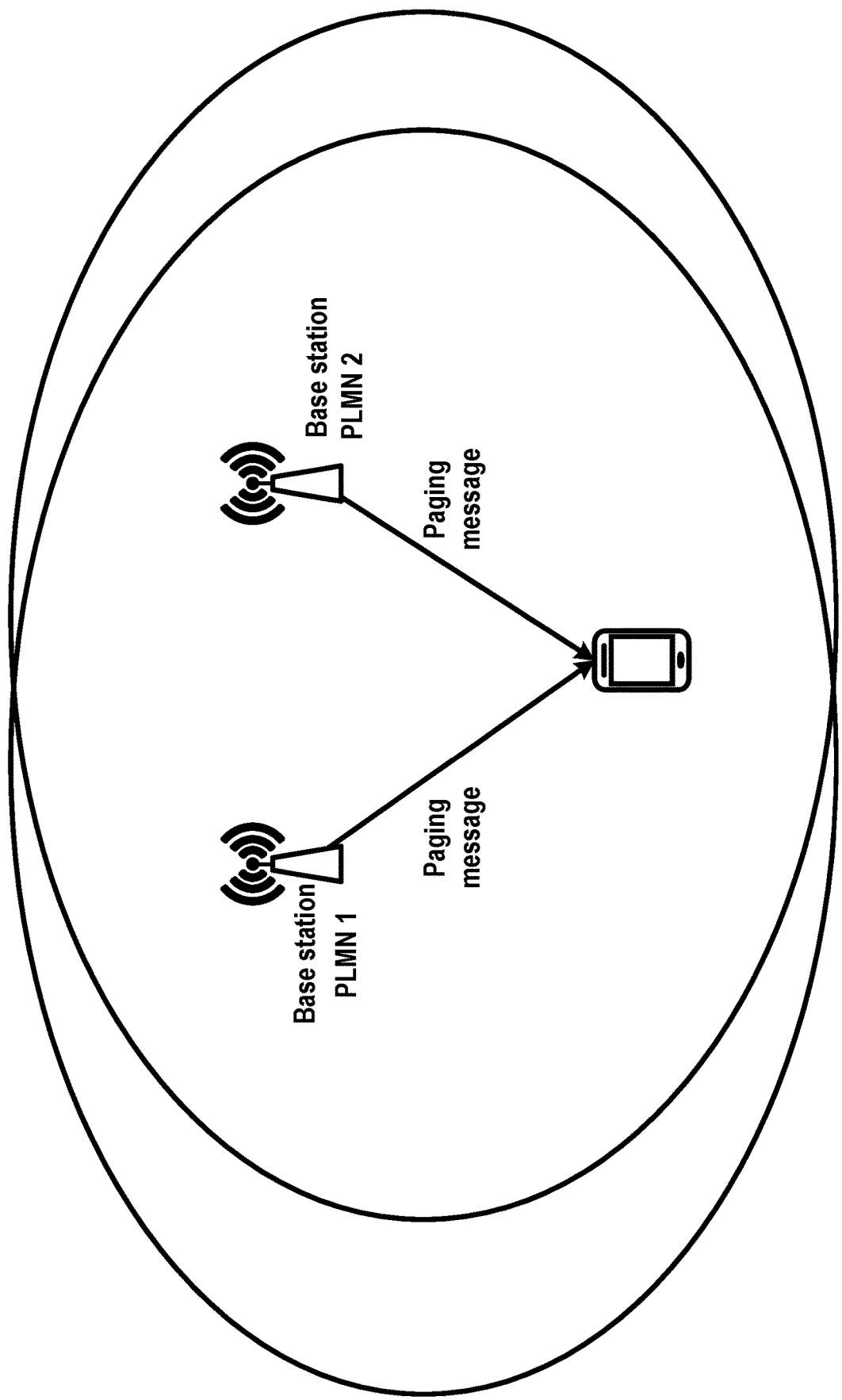
FIG. 25 is an example diagram for simultaneously monitoring two different PLMNs by a dual-SIM device.

As depicted in FIG. 25, a dual-SIM UE may monitor paging messages from a base station of a PLMN 1 and a base station of PLMN 2 simultaneously. In an example, the UE may employ a single or more receivers and single transmitter. When the UE receives a paging message from the base station of the PLMN 1, the UE may (depending on implementation and configuration) drop the (data) connection (if any) with the base station of the PLMN 2.

In existing wireless technologies, a UE may need to monitor two different paging messages from two different systems simultaneously. For an example, a dual-SIM UE may monitor two different paging messages from two different subscribed public land mobile networks (PLMNs). In an example, the dual-SIM UE may comprise single receiver (Rx chain) so the UE may not be able to monitor/receive two different paging messages simultaneously. In an example, the dual-SIM UE may comprise dual receivers. The dual-SIM UE with dual receiver may employ a dual connectivity or a carrier aggregation using dual receiver for one subscription so the UE may not be able to monitor two different paging messages simultaneously. It may be possible that the paging monitoring occasions for each subscriptions of the UE may occur around the same time for the UE. It may result in paging collision between the subscriptions, as depicted in FIG. 26A. In this case, the UE may be able to receive a paging message of one subscription (e.g. PLMN 2) and the UE may not be able to receive a paging message of the other subscription (e.g. PLMN 1). In an example, the paging collision may occur when the time of paging occasion of each subscription is overlapped. In an example, the paging collision may occur when the time of paging occasion of each subscription is not overlapped but there is not enough time for frequency tuning between two PLMNs. In an example, two different PLMNs may employ different frequencies so a UE may need to tune to different frequency. The frequency tuning (e.g. form frequency 1 of PLMN 1 to frequency 2 of PLMN 2) may take a certain period of time. Missing paging message due to paging collision may decrease a performance of a user experience and it may decrease popularity of the dual-SIM UEs.

In an example embodiment, a UE may determine a need of paging adjustment with a serving PLMN. In an example, the determining may be based on paging collision detection with other PLMN or other service in the same PLMN. In an example, the determining may be based on a need of power saving of the UE to minimize a number of wake up for paging monitoring of one more subscription. The UE may send paging adjustment information to an AMF during registration procedure and the AMF may determine paging adjustment parameters based on the paging adjustment information for UE in CM-IDLE state. For RRC-INACTIVE case, the AMF may provide a core network parameter for paging adjustment based on the paging adjustment information to the base station during a context setup procedure. The base station may determine a parameter for a RAN paging adjustment based on the core network parameter for paging adjustment and may send to the UE during radio resource control (RRC) suspension procedure. Embodiments of the present disclosure may increase a performance of a user experience by decreasing of paging collision occurrence of a UE in CM-IDLE state and in RRC-INACTIVE state. Embodiments of the present disclosure may increase power efficiency of the UE by allocating the paging monitoring occasions of two different subscription in an adjacent time to minimize the number of wake up for paging monitoring.

Figure 28:
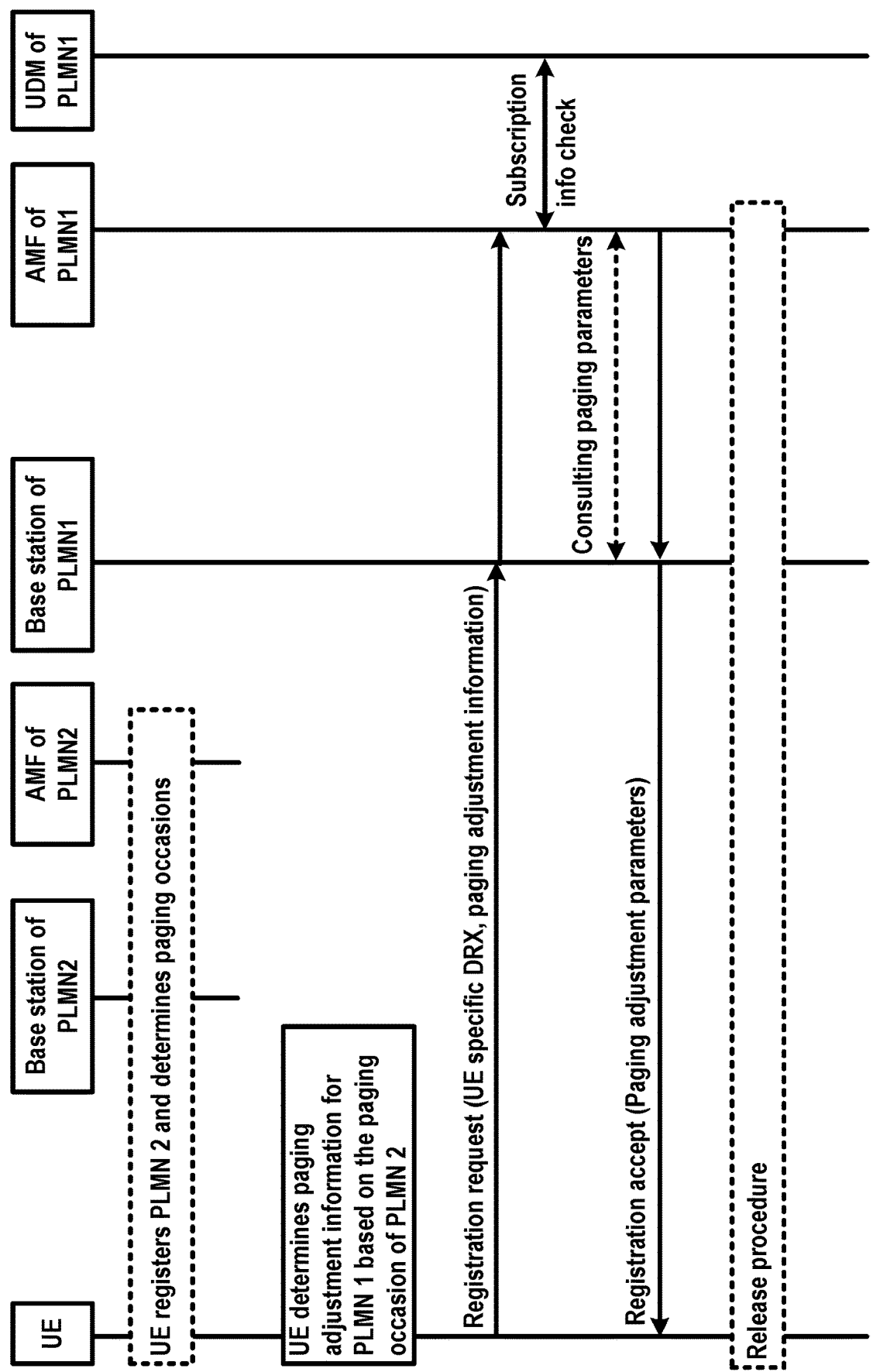
FIG. 28 illustrates an example embodiment of a present disclosure for paging adjustment procedure.
Figure 29:
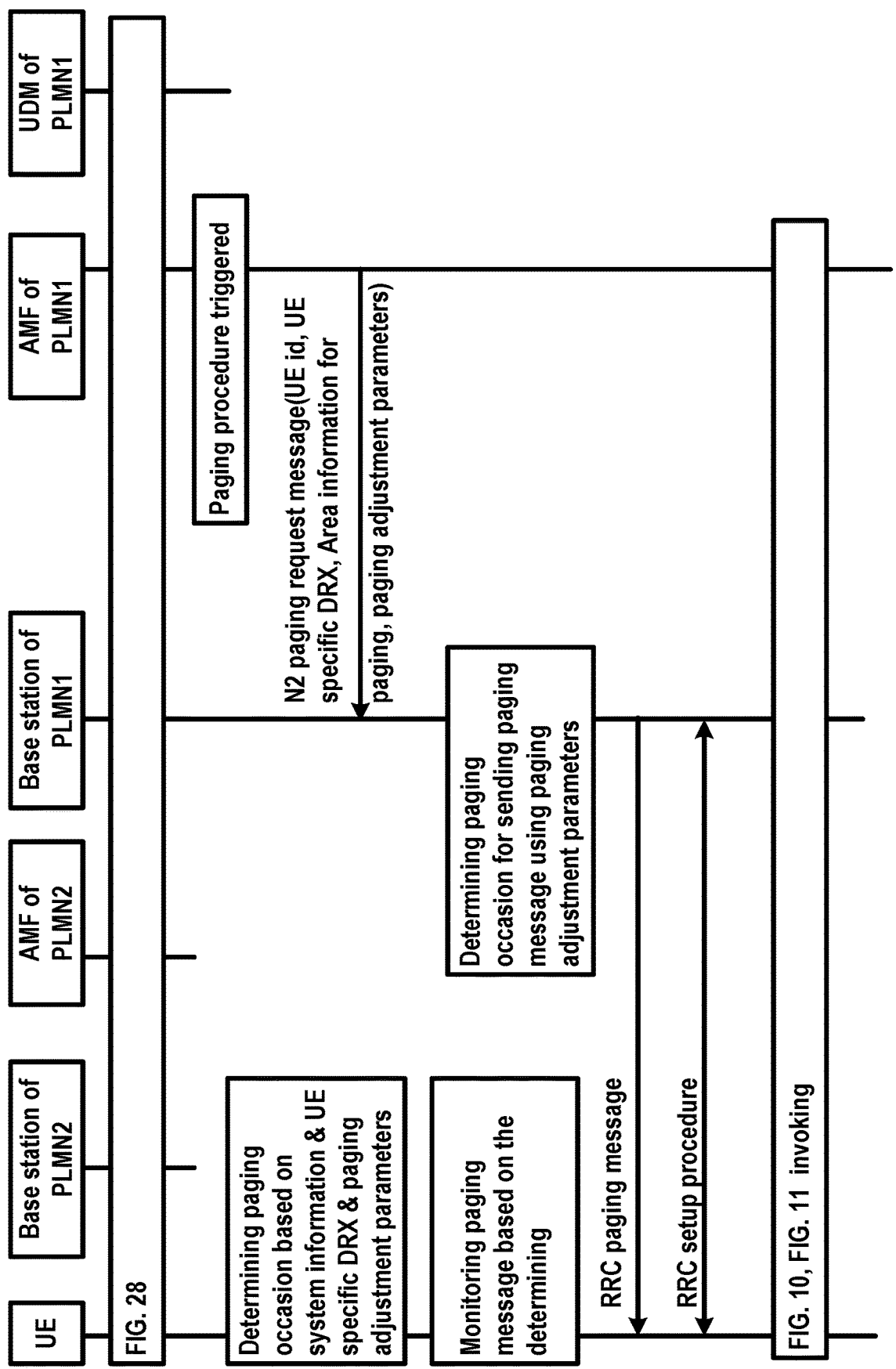
FIG. 29 illustrates an example embodiment of a present disclosure for UE in CM-IDLE state.

FIG. 28 illustrates an example embodiment of a paging adjustment request procedure between a UE and an AMF. FIG. 29 illustrates an example embodiment of a paging procedure for a UE in CM-IDLE after the paging adjustment is negotiated. In an example, the UE may be a multi-SIM device. In an example, the UE may be dual-SIM device.

Referring to FIG. 28, the UE may be registered with an AMF of PLMN 2 previously. In an example, the UE may read system information blocks of a base station of a PLMN 1. In an example, the UE may determine an occurrence of paging collision between PLMN 1 and PLMN 2. The determination may be based on paging occasion calculation using the information in system information block 1. The UE may calculate a paging frame and paging occasion based on the shortest paging DRX cycle between a cell specific DRX in system information block 1 and a UE specific DRX. In an example, the UE may provide paging adjustment information during initial registration with the PLMN 1.

In an example, the UE may be registered previously with an AMF of PLMN 1 and determine a need of paging adjustment with PLMN 1. In an example, the UE may perform registration update with the PLMN 1 by sending registration request message comprising paging adjustment information.

In response to the determining, the UE may send a registration request message comprising the paging adjustment information, via a base station to the AMF of the PLMN 1, requesting a registration with PLMN 1. In an example, the registration request message may comprise a UE specific DRX, paging adjustment information, a UE identity (e.g., SUCI, 5G-GUTI), the location of the UE (e.g., last visited TAI), requested NSSAI, UE mobility management context information, PDU session state, information for the MICO mode usage, and/or the like.

In an example, the paging adjustment information may comprise non-preferred system frame number(s) for paging, preferred system frame number(s) for paging, a conflicted system frame number(s) for paging, a requested paging offset value represented as a system frame number, a requested paging offset value represented as a time period, a requested paging offset value represented as a UE identity, an indication that paging repetition is required, an indication that paging occasion is conflicted, a requested paging repetition number, non-preferred frequency/band for paging, preferred frequency/band for paging, an indication that a UE specific discontinuous reception (DRX) being preferred and/or the like.

In an example, the non-preferred system frame number(s) for paging may be system frame number(s) that the UE detected paging collision.

In an example, the preferred system frame number(s) for paging may be system frame number(s) that the UE may prefer to monitor paging with the PLMN 1.

In an example, the conflicted system frame number(s) for paging may be system frame number(s) that the UE detected paging collision.

Figure 27A:
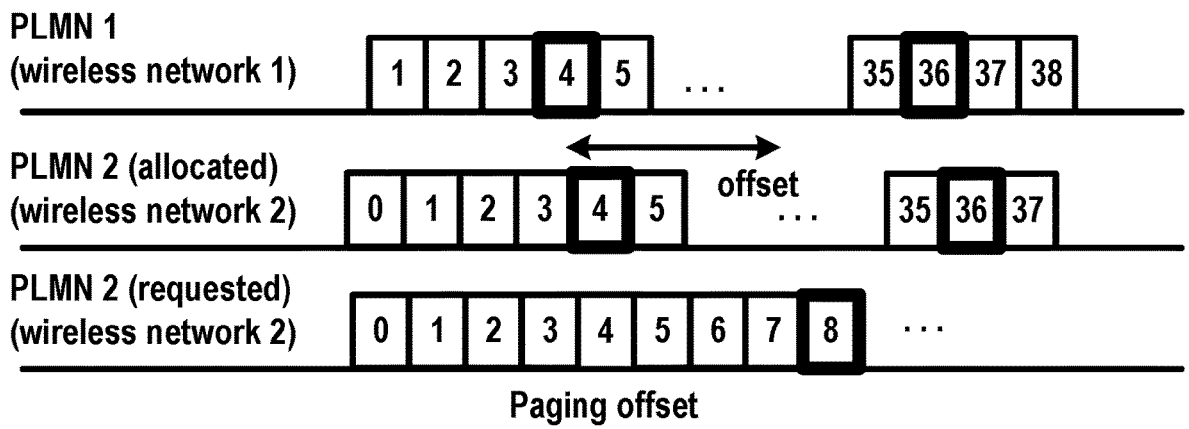
FIG. 27A illustrates an example embodiment of a present disclosure using paging offset.

In an example, the requested paging offset value represented as a system frame number may be a number of radio frame(s) that the UE request to shift for paging monitoring. FIG. 27A shows example diagram for the paging offset value.

In an example, the requested paging offset value represented as a time period may be a time period that the UE request to shift for paging monitoring.

In an example, the requested paging offset value represented as a UE identity may be used as an offset value to UE_ID in the equation in FIG. 19C or FIG. 19D. In an example, the UE_ID in FIG. 19C and FIG. 19D may be modified with the requested paging offset value represented as a UE identity. In an example, the paging frame number and paging occasion may be modified in response to using the requested paging offset. In an example, the paging collision may be resolved by the paging offset for the UE_ID.

Figure 27B:
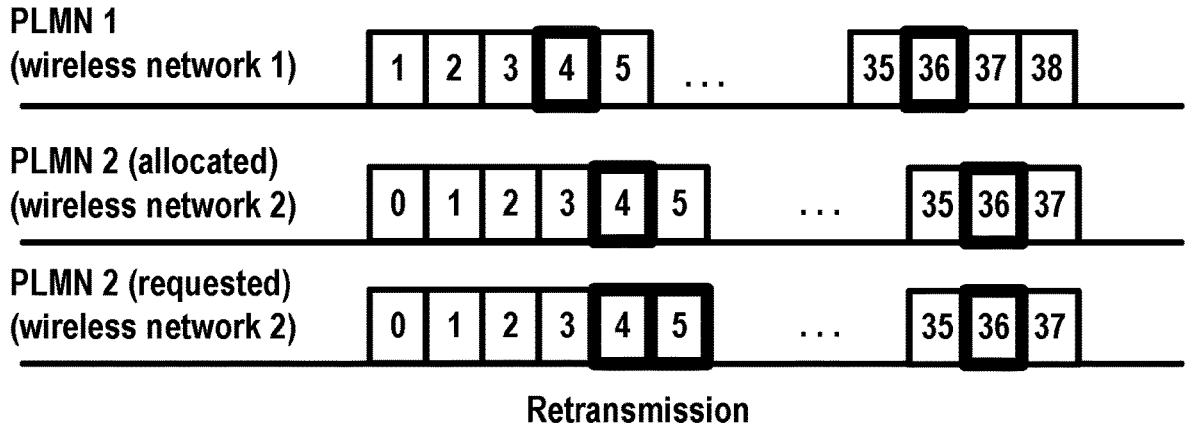
FIG. 27B illustrates an example embodiment of a present disclosure using paging retransmission.

In an example, the indication that paging repetition is required may be used by the AMF that paging retransmission is needed for this UE, as depicted in FIG. 27B.

In an example, the indication that paging occasion is conflicted may be used by the AMF that paging occasion adjustment or modification is requested.

In an example, the requested paging repetition number may be used by the AMF that paging retransmission is needed for this UE, as depicted in FIG. 27B.

In an example, the non-preferred frequency/band for paging may be frequency/band (s) that the UE used for communication or monitoring for other subscription (e.g. SIM 2 of PLMN 2). In an example, the UE may indicate the non-preferred frequency/band if the UE wants to avoid using with PLMN 1.

In an example, the preferred frequency/band for paging may be frequency/band (s) that the UE wants to use with PLMN 1.

Figure 27C:
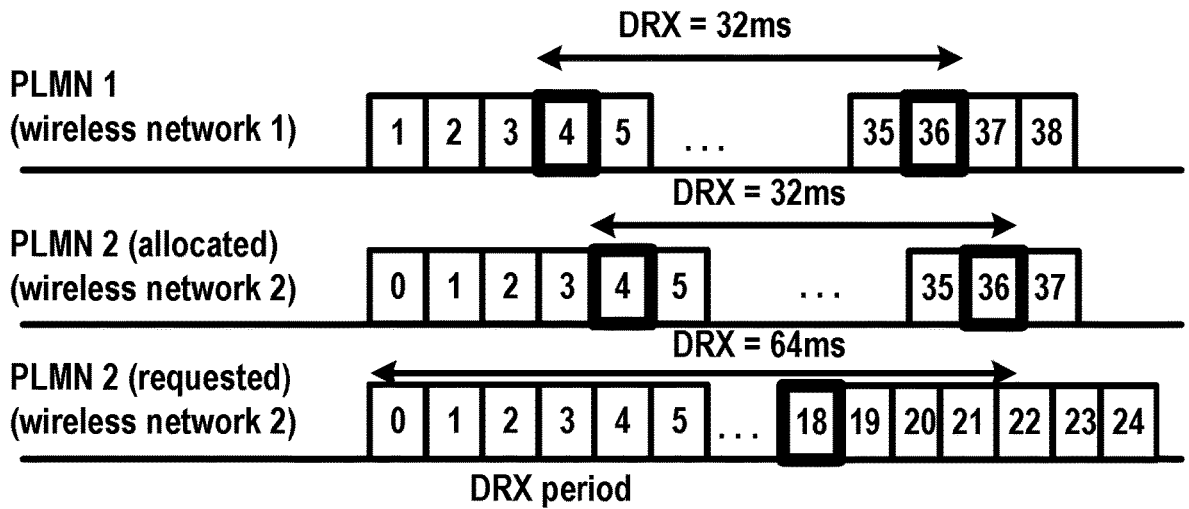
FIG. 27C illustrates an example embodiment of a present disclosure using UE specific discontinuous reception (DRX).

In an example, the UE may determine that the paging collision may be resolved if the UE using the UE specific DRX instead of the cell specific DRX, as depicted in FIG. 27C. In this case the UE may indicate the indication that a UE specific discontinuous reception (DRX) being preferred.

In an example, the AMF may determine whether to accept the request from the UE for the paging adjustment. The AMF may determine based on the request for paging adjustment, a local policy of the AMF, subscription information of the UE in a UDM, an overload situation of a paging resource of the system and/or the like. In an example, the AMF may not accept the request if the local policy of the AMF does not allow it. In an example, the AMF may not accept the request if the subscription information of the UE does not fulfill the paging adjustment for the UE. In an example, the AMF may not accept the paging adjustment request if the paging resource usage condition does not allow it.

In an example, the AMF may accept the paging adjustment request in response to the determination. The AMF may determine paging adjustment parameters for the UE. In an example, the AMF may consult to the base station to get the paging adjustment parameters for the paging adjustment information. The AMF may send a registration accept message to the UE indicating a successful registration. In an example, the registration accept message may comprise 5G-GUTI, registration area, a periodic registration area update time value, a MICO mode indication, paging adjustment parameters and/or the like.

In an example, the paging adjustment parameters may comprise a paging time offset comprising number of radio frames and/or number of radio sub-frames, a paging UE identity offset, frequency/band information for paging, frequency/band information not used for paging, paging repetition number, an indication that a UE specific discontinuous reception (DRX) is prioritized and/or the like.

In an example, a paging frame (PF) based on the paging adjustment parameter may be incremented with the paging time offset in response to the paging adjustment parameter being the paging time offset. In an example, the final PF of FIG. 19C may be system frame number (SFN) 38 in response to the initial PF is SFN 30 and the paging time offset is SFN 8.

In an example, the paging time offset may be used to replace the PF_offset in the question of FIG. 19D. In an example, the PF_offset is cell specific paging offset value. In an example, the UE and the base station may be used the paging time offset instead of the cell specific paging offset 'PF_offset'.

In an example, the UE_ID in FIG. 19C and FIG. 19D may be incremented based on the paging UE identity offset, in response to the paging adjustment parameter being the paging UE identity offset. In an example, IMSI of the UE is '1234123412341234' and the paging UE identity offset is '1021' then the UE ID for calculation of the paging frame and the paging occasion may be the IMSI (1234123412341234) plus the paging UE identity offset (1021) and the UE_ID may be '12341234123412342255'.

In an example, the UE may monitor frequencies/bands for paging reception in the frequency/band information for paging, in response to the paging adjustment parameter being the frequency/band information for paging.

In an example, the UE may not monitor frequencies/bands for paging reception in the frequency/band information not used for paging, in response to the paging adjustment parameter being the frequency/band information not used for paging.

In an example, the UE may monitor consecutive system frame number for paging, in response to the paging adjustment parameter being the paging repetition number. In an example, the calculated paging frame using question 19.0 and 19.0 is SFN 34 and the paging repetition number is 2, then the UE may monitor the system frame number 34, 35, 36 for paging reception.

In an example, the UE may use the UE specific discontinuous reception (DRX) value instead of a default DRX value of the base station, in response to the paging adjustment parameters being the indication that a UE specific discontinuous reception (DRX) is prioritized. In an example, the T value of the FIG. 19B is Tue. In an example, the UE may not employ min (Tue, Tc) condition in response to the paging adjustment parameters being the indication that a UE specific discontinuous reception (DRX) is prioritized.

In an example, the AMF and the base station may determine a connection release with the UE. In an example, the determination of the connection release with the UE may be based on UE inactivity detection for a period of time (e.g. there is no transmission from or reception by the UE in 10 seconds). In an example, the UE may enter in an CM-IDLE state from a CM-CONNECTED state in response to a completion of a connection release. In an example, the completion of the connection release may be receiving an RRC release message from the base station. In an example, the UE state in the AMF may change to CM-IDLE state from the CM-CONNECTED state.

Now referring to FIG. 29, the UE may monitor paging messages based on the paging adjustment parameters and the network may send paging messages based on the paging adjustment parameters. The UE may determine paging occasion (e.g. PF, PO) based on the paging adjustment parameters, broadcasted system information by the base station, a UE specific DRX and/or the like.

In an example, a paging procedure may be triggered by the AMF of the PLMN 1, in response to an occurrence of a network triggered service request. In an example, the network triggered service request may be triggered by a UPF in response to receiving downlink data. In an example, the network triggered service request may be triggered by some network functions (e.g. NEF, SMSF, PCF) to request a delivery of control signaling for the UE. In an example, PCF may request the network triggered service request due to change of a UE policy. In an example, the network triggered service request may be triggered by the AMF itself, due to a change of UE configuration (e.g. MICO disabling, slice information update).

In an example, the AMF may send paging messages over the N2 interface to relevant base stations (gNBs) belonging to the tracking areas at which the UE is expected to be placed. In an example, the paging message may be N2 paging request message. In an example, the paging message may comprise UE identity, an access type, UE specific DRX, area information for paging, paging adjustment parameters and/or the like. In an example, the UE identity may indicate 5G S-TMSI. In an example, the access type may indicate a third-generation partnership project (3GPP) access technology. In an example, the area information may comprise a list of cell identities for paging. In an example, the UE specific DRX may be previously negotiated DRX value between the UE and the AMF in recent registration procedure. The paging adjustment parameters may comprise a paging time offset comprising number of radio frames and/or number of radio sub-frames, a paging UE identity offset, frequency/band information for paging, frequency/and information not used for paging, paging repetition number, an indication that a UE specific discontinuous reception (DRX) is prioritized and/or the like. In an example, the base station may use the paging adjustment parameter for paging frame and paging occasion calculation for the UE.

In an example, the UE may receive the paging message successfully. The UE may determine to send a radio resource control (RRC) message to request a connection setup with the PLMN 1 in response to receiving the paging message.

In an example, the UE may receive an RRC request response message in response sending the RRC request message. The UE may send an RRC request complete message to the base station. The RRC request complete message may comprise a NAS service request message. After this, the UE triggered service request procedure may be invoked as described in FIG. 10 and FIG. 11.

Figure 30:
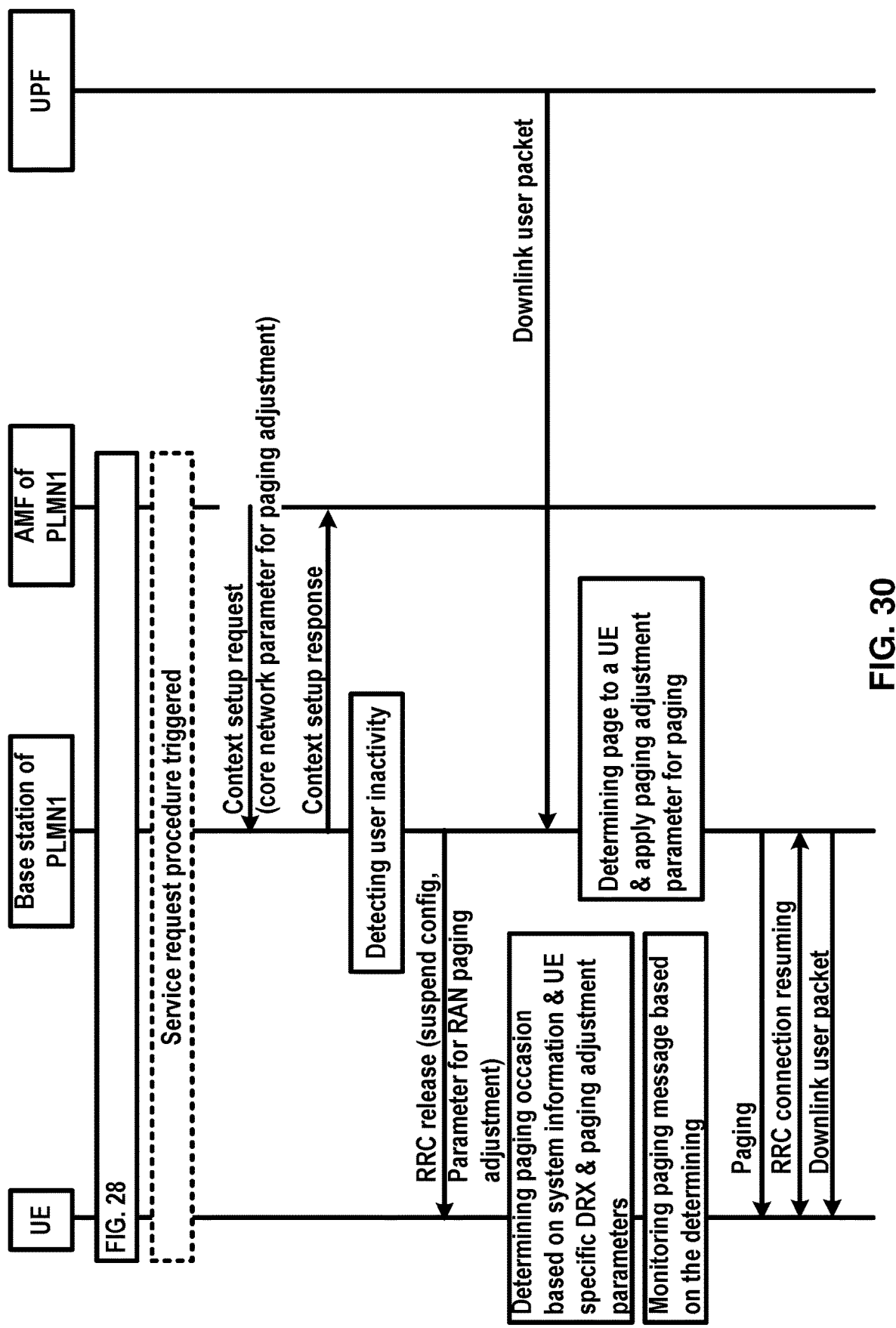
FIG. 30 illustrates an example embodiment of a present disclosure for UE in RRC-INACTIVE state.

FIG. 30 illustrates a paging procedure for a UE in CM-CONNECTED/RRC-INACTIVE after the paging adjustment is negotiated as explained FIG. 28 description.

Referring to FIG. 28, the UE may determine an occurrence of paging collision between PLMN 1 and PLMN 2. In an example, the UE may provide paging adjustment information during registration procedure with the PLMN 1, in response to the determining of the paging collision. In an example, the AMF may determine a paging adjustment parameter in response to the paging adjustment information successfully as explained in FIG. 28. For the CM-CONNECTED/RRC-INACTIVE case, the release procedure of the FIG. 28 may be skipped.

Now referring to FIG. 30, a service request procedure, as shown in FIG. 10 and FIG. 11, may be performed between the UE and the network of the PLMN 1. In an example, the AMF may send a context setup request message to the base station as part of the service request procedure. In an example, the context setup request message may be an initial context setup request message. In an example, the context setup request message may be a UE context modification request message. In an example, the context setup request message may comprise a parameter indicating MICO mode is allowed/accepted for the UE, AMF UE NGAP ID, RAN UE NGAP ID, old AMF address, UE aggregate maximum bit rate, PDU session information for setup, and/or the like. In an example, the AMF UE NGAP ID may uniquely identify a UE association over the NG interface (e.g. N2 interface) within the AMF side. The RAN UE NGAP ID may uniquely identify a UE association over the NG interface within the NG-RAN side. In an example, the context setup request message may further comprise a core network parameter for paging adjustment in response to the paging adjustment negotiation.

In an example, the core network parameter for paging may comprise non-preferred system frame number for paging, preferred system frame number for paging, a conflicted system frame number for paging, a requested paging offset value represented as a system frame number, a requested paging offset value represented as a time period, a requested paging offset value represented as a UE identity, an indication that paging repetition is required, an indication that paging occasion is conflicted, a requested paging repetition number, non-preferred frequency/band for paging, preferred frequency/band for paging, an indication that a UE specific discontinuous reception (DRX) being preferred and/or the like. In an example, the base station may determine a parameter for RAN paging adjustment based on the core network parameter for paging. In an example, the parameter for RAN paging adjustment may comprise a paging time offset comprising number of radio frames and/or number of radio sub-frames, a paging UE identity offset, frequency/band information for paging, frequency/and information not used for paging, paging repetition number, an indication that a UE specific discontinuous reception (DRX) is prioritized and/or the like.

In an example, the core network parameter for paging may comprise a paging time offset comprising number of radio frames and/or number of radio sub-frames, a paging UE identity offset, frequency/band information for paging, frequency/and information not used for paging, paging repetition number, an indication that a UE specific discontinuous reception (DRX) is prioritized and/or the like. In an example, the base station may determine a parameter for RAN paging adjustment based on the core network parameter for paging. In an example, the core network parameter for paging and the parameter for RAN paging adjustment may be same. In an example, the base station may modify the core network parameter for paging to the parameter for RAN paging adjustment based on congestion situation of the base station, allocated paging resource situation, and/or the like.

In an example, the base station may send a context setup response message in response to receiving the context setup request message from the AMF. In an example, the context setup response message may be an initial context setup response. In an example, the context setup response message may be a UE context modification response message. In an example, the context setup response message may AMF UE NGAP ID, RAN UE NGAP ID, PDU session resource setup response list, PDU session resource failed to setup list and/or the like.

In an example, the base station may detect an inactivity of the UE and determine to suspend an RRC connection with the UE. In an example, the base station may send an RRC release message to the UE in response to the determination. In an example, the RRC release message may comprise suspension/suspend configuration information, the parameter for RAN paging adjustment, and/or the like.

In an example, the suspension/suspend configuration information may comprise a radio network temporary identity (RNTI), a radio access network (RAN) paging cycle, a RAN notification area (RNA) information, a periodic RNA update time value, and/or the like. In an example, the RAN notification area information may comprise a list of cells, a PLMN identity, a list of tracking area codes, a list of RAN area code, and/or the like.

In an example, the parameter for RAN paging adjustment may comprise a paging time offset comprising number of radio frames and/or number of radio sub-frames, a paging UE identity offset, frequency/band information for paging, frequency/and information not used for paging, paging repetition number, an indication that a UE specific discontinuous reception (DRX) is prioritized and/or the like.

In an example, a paging frame (PF) based on the paging adjustment parameter may be incremented with the paging time offset in response to the paging adjustment parameter being the paging time offset. In an example, the final PF of FIG. 19C may be system frame number (SFN) 38 in response to the initial PF is SFN 30 and the paging time offset is SFN 8.

In an example, the paging time offset may be used to replace the PF_offset in the equation of FIG. 19D. In an example, the PF_offset is cell specific paging offset value. In an example, the UE and the base station may use the paging time offset instead of the cell specific paging offset 'PF_offset'.

In an example, the UE_ID in FIG. 19C and FIG. 19D may be incremented based on the paging UE identity offset, in response to the paging adjustment parameter being the paging UE identity offset. In an example, IMSI of the UE is '1234123412341234' and the paging UE identity offset is '1021' then the UE_ID for calculation of the paging frame and the paging occasion may be the IMSI (1234123412341234) plus the paging UE identity offset (1021) and the UE_ID may be '12341234123412342255'.

In an example, the UE may monitor frequencies/bands for paging reception in the frequency/band information for paging, in response to the paging adjustment parameter being the frequency/band information for paging.

In an example, the UE may not monitor frequencies/bands for paging reception in the frequency/band information not used for paging, in response to the paging adjustment parameter being the frequency/band information not used for paging.

In an example, the UE may monitor consecutive system frame number for paging, in response to the paging adjustment parameter being the paging repetition number. In an example, the calculated paging frame using question 19.0 and 19.0 is SFN 34 and the paging repetition number is 2, then the UE may monitor the system frame number 34, 35, 36 for paging reception.

In an example, the UE may use the UE specific discontinuous reception (DRX) value instead of a default DRX value of the base station, in response to the paging adjustment parameters being the indication that a UE specific discontinuous reception (DRX) is prioritized. In an example, the T value of the FIG. 19B is Tue. In an example, the UE may not employ min (Tue, Tc) condition in response to the paging adjustment parameters being the indication that a UE specific discontinuous reception (DRX) is prioritized. In an example, the UE specific DRX may be the radio access network (RAN) paging cycle.

In an example, the UE may receive the paging message successfully. In an example, the UE may send an RRC resume request message to the base station in response to receiving the paging message. In an example, the base station may respond by sending an RRC resume message in response to receiving the RRC resume request message. In an example, the previously configured RRC connection may be successfully resumed between the UE and the base station. The base station may transfer a packet data or a NAS PDU to the UE.

Figure 31:
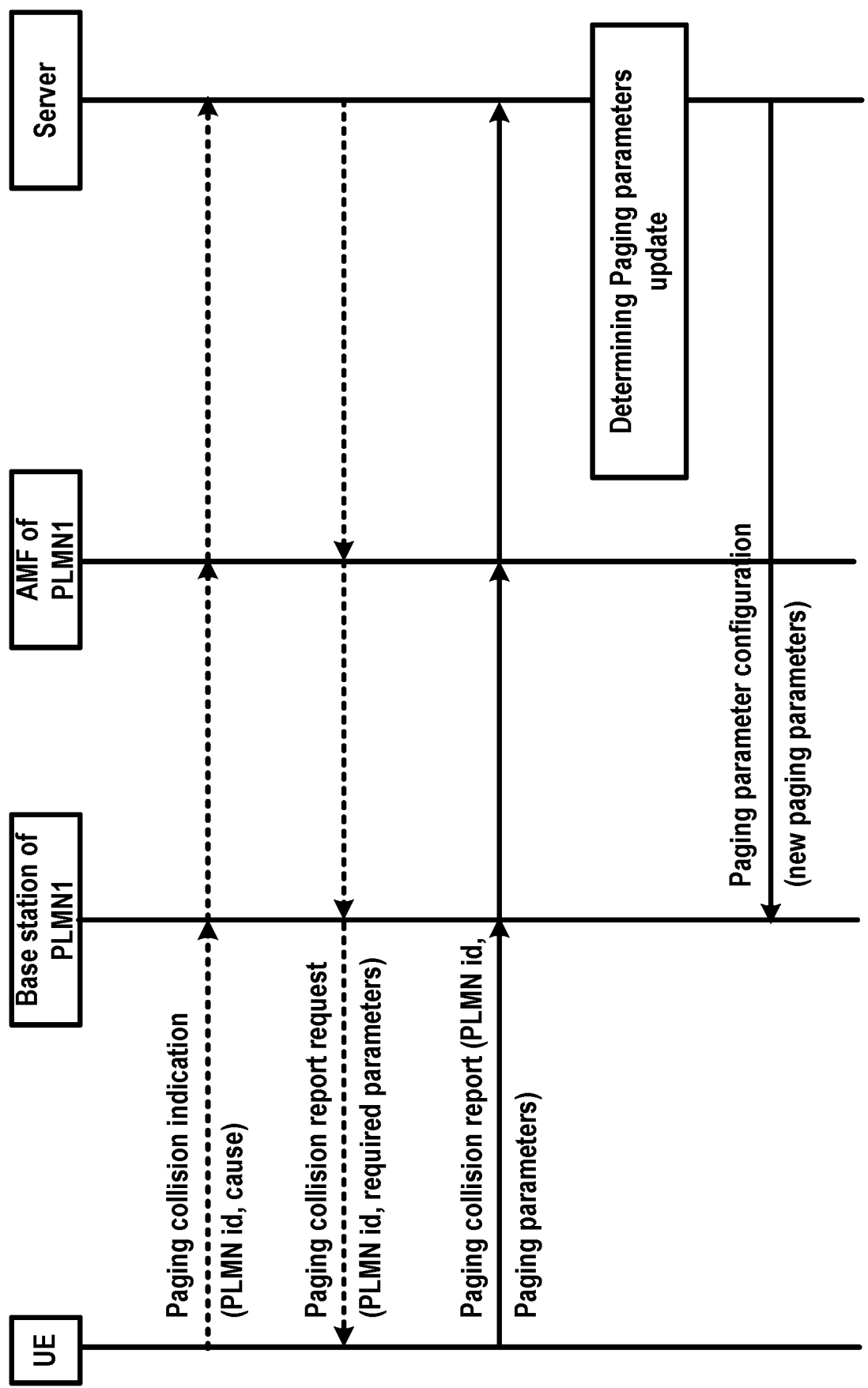
FIG. 31 illustrates an example embodiment of a paging parameters configuration procedure.

FIG. 31 illustrates an example embodiment of a radio access network parameter configuration update procedure between a UE and, a base station, an AMF and a server. In an example, the server may be a network data analytics function (NWDAF). In an example, the server may be an operations, administration and management (OA&M) function.

In an example, the UE may detect an occurrence of a paging collision (between serving network (e.g. PLMN 1) and other system network). In an example, the UE may send a paging collision indication message to the AMF. In an example, the UE may send a paging collision indication message to the server via the AMF. In an example, the paging collision indication message may comprise a PLMN identity, cause value, and/or the like. In an example, the PLMN identity may the identity of a neighbor PLMN which the UE detects a paging collision with the serving PLMN. In an example, the neighbor PLMN may a PLMN that provide services in a wide area (e.g. country, continental). In an example, the servicing PLMN may provide services in a smaller area (e.g. city or state). In an example, the cause value may indicate an occurrence of a paging collision.

In an example, the serving PLMN may not provide voice service to the UE and may want to configure paging parameters/DRX parameters based on neighbor PLMN paging parameters/DRX parameters. In an example, the serving PLMN may want to avoid a paging collision with a neighbor PLMN which provide voice service to the UE.

In an example, the serving PLMN (e.g. PLMN 1) may indicate to the UEs reporting any occurrence of paging collision. In an example, serving PLMN may provide a certain PLMN identity which the serving PLMN want to know the configuration of paging parameters/DRX parameters. In an example, the server or the AMF of the serving PLMN (e.g. PLMN 1) may send a paging collision report request message to the UE in response to receiving the paging collision indication message. In an example, the serving PLMN may request paging collision report based on the PLMN identity of the paging collision indication message. In an example, the serving PLMN may not ask a paging collision report from the UE if the PLMN identity is not interest for paging collision resolving for the serving PLMN.

In an example, the AMF or the server may send a paging collision report request message to the UE in response to receiving the paging collision indication message. The paging collision report request message may comprise a PLMN identity and required parameters.

In an example, the UE may send a paging collision report message to the AMF or the Server. In an example, the UE may send the paging collision report message in response to receiving the paging collision report request message. In an example, the paging collision report message may comprise a PLMN identity of a neighbor PLMN, paging configuration parameters of the PLMN, and/or the like. In an example, the UE may determine the paging configuration parameters based on the required parameters. The paging configuration parameters (e.g. Tc, nB, PF_Offset, i_s) may comprise DRX parameters which are broadcasted by a base station of the neighbor PLMN.

In an example, the AMF or the server may receive the paging collision report message from multiple UEs which experienced the paging collision. The AMF or the Server may determine new paging parameters/DRX parameters of the serving PLMN based on the paging configuration parameters of the neighbor PLMN and may send to the base stations of the serving PLMN.

Figure 32:
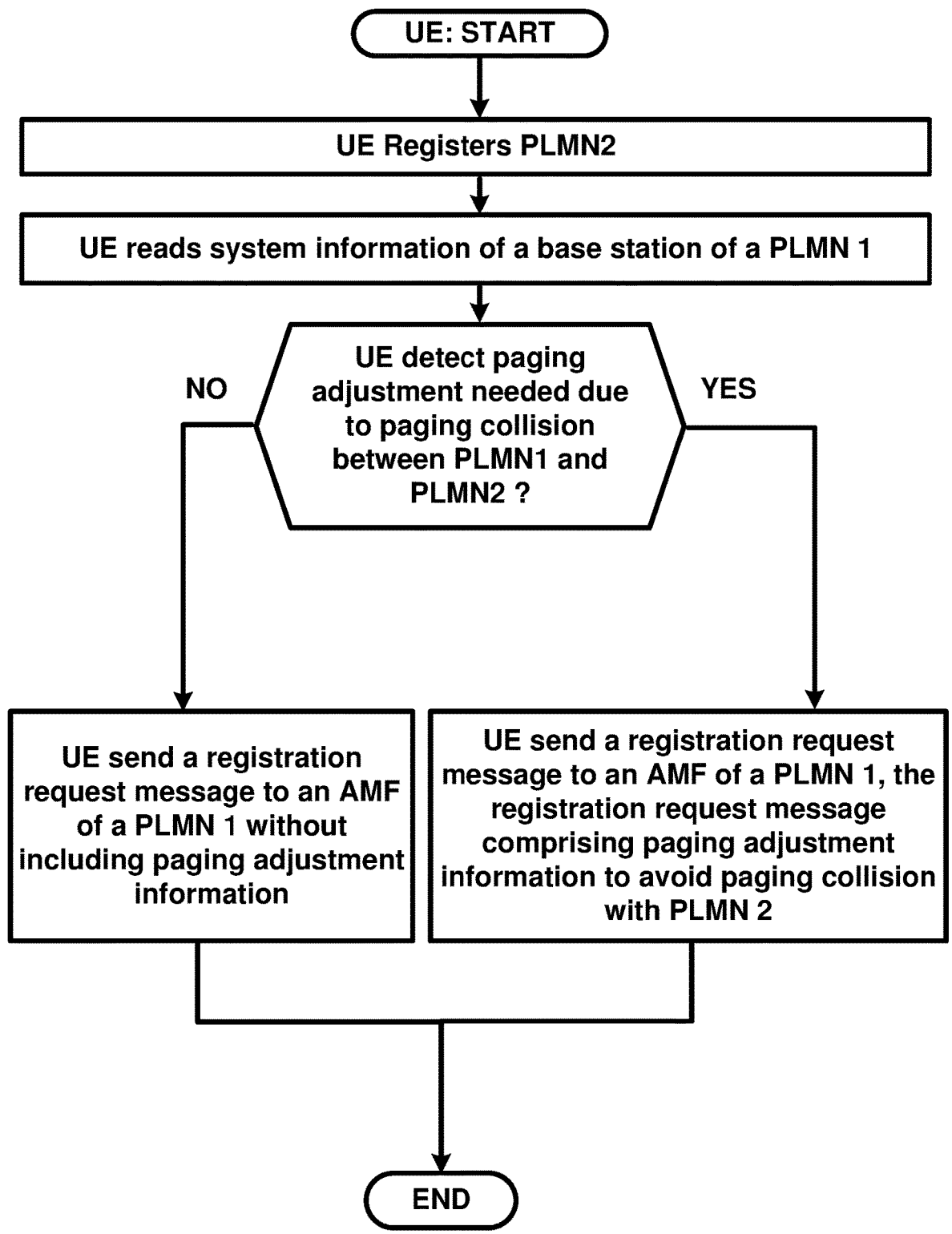
FIG. 32 illustrates an example flow chart from a wireless device for the present disclosure.
Figure 33:
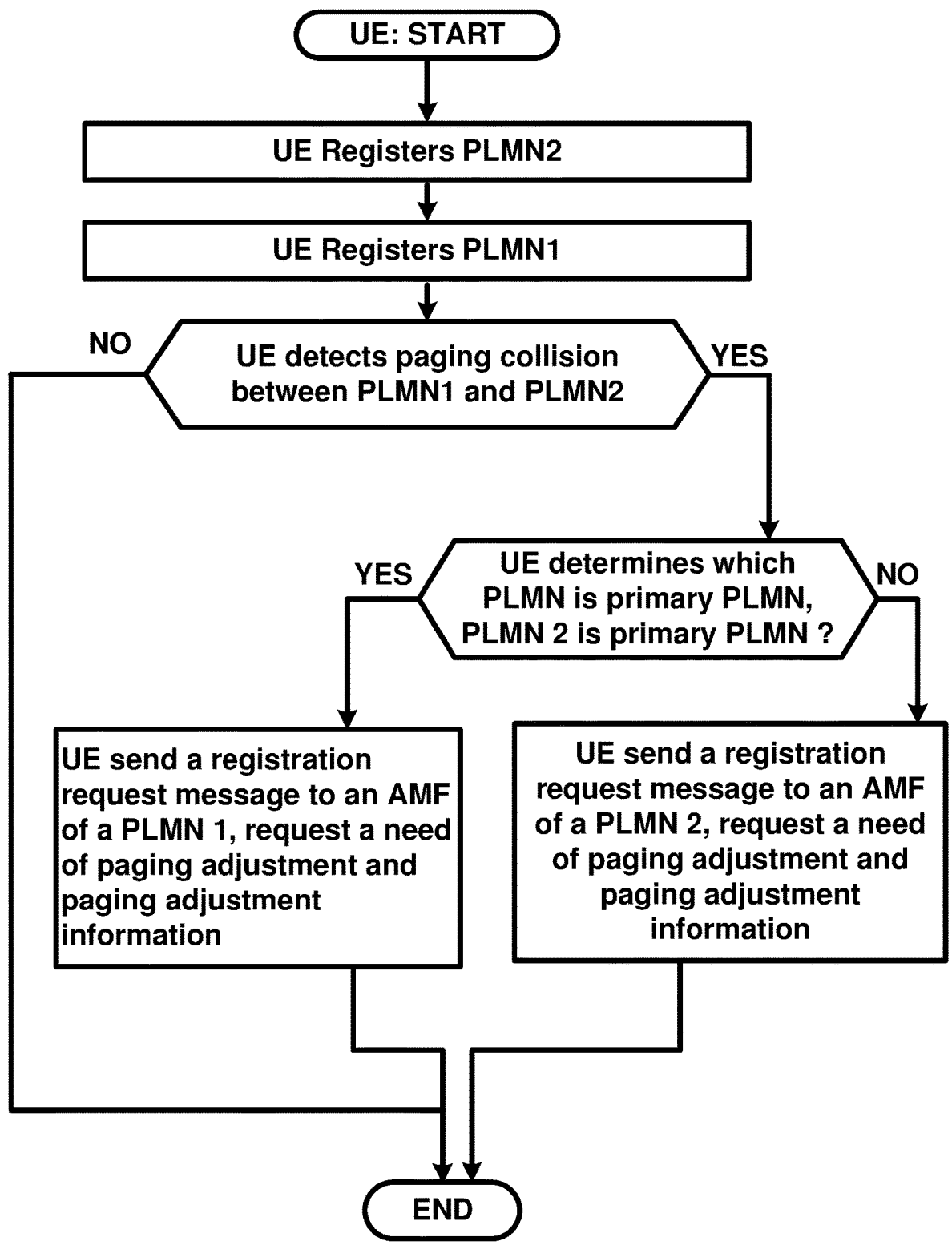
FIG. 33 illustrates an example flow chart from a wireless device for the present disclosure.
Figure 34:
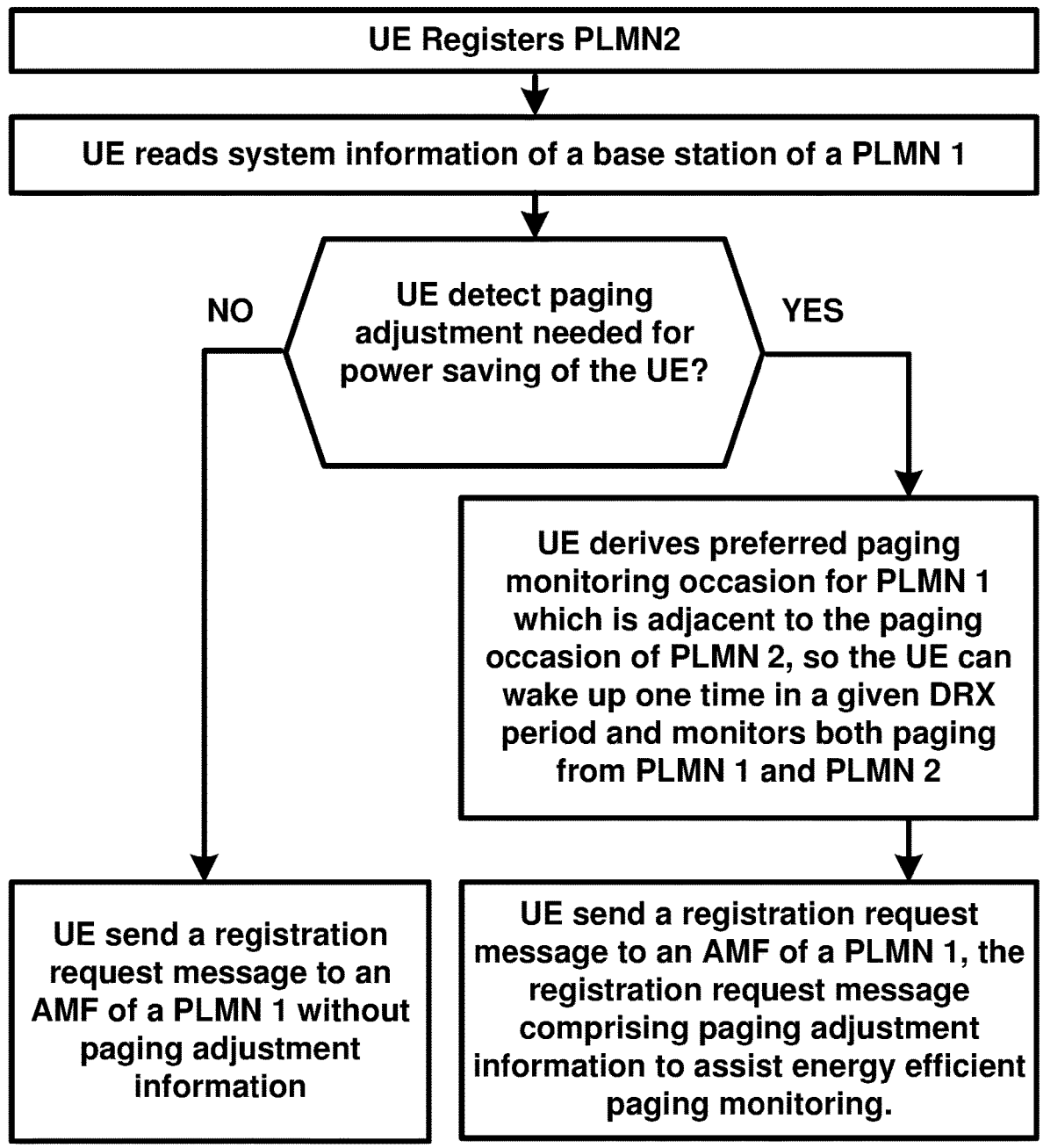
FIG. 34 illustrates an example flow chart from a wireless device for the present disclosure.

FIG. 32, FIG. 33 and FIG. 34 are example flow chart illustrating how a UE determine paging adjustment is required to resolve paging collision situation or UE battery efficiency and/or the like.

In FIG. 32, a UE may register a second PLMN. The UE may receive system information from a base station of a first PLMN. The UE may read the system information. The UE may detect that paging adjustment is needed due to paging collision between the first PLMN and the second PLMN. If the UE determines that paging adjustment is needed, the UE may send a registration request message to an AMF of the first PLMN. The registration request message may comprise paging adjustment information to avoid paging collision with the second PLMN. If the UE determines that paging adjustment is not needed, the UE may send a registration request message to the AMF of the first PLMN. The registration request message may not comprise paging adjustment information.

In FIG. 33, a UE may register a second PLMN and a first PLMN. If the UE detects paging collision between the first PLMN and the second PLMN, the UE may determine which PLMN is primary PLMN. In an example, the primary PLMN may be a higher priority PLMN for the UE. If the second PLMN is a primary PLMN, the UE may send a registration request message to an AMF of the first PLMN, requesting a need of paging adjustment and paging adjustment information. If second PLMN is not a primary PLMN, the UE may send a registration request message to an AMF of the second PLMN, requesting a need of paging adjustment and paging adjustment information.

In FIG. 34, a UE may register a second PLMN. The UE may receive system information of a base station of a first PLMN. The UE may read the system information and my detect whether paging adjustment needed for power saving of the UE. If the UE determine that paging adjustment for power saving between the first PLMN and the second PLMN is needed, the UE may derive preferred paging monitoring occasion of the first PLMN which is adjacent to the paging occasion of the second PLMN. Based on the paging adjustment, the UE may wake up one time in a given DRX period and monitor both paging from first PLMN and the second PLMN. The UE may send a registration request message to an AMF of the first PLMN. The registration message may comprise paging adjustment information to assist energy efficient paging monitoring. If the UE determine that paging adjustment for power saving is not needed, the UE may send a registration request message to the AMF of the first PLMN without the paging adjustment information.

In an example, a wireless device may send to an access and mobility management function (AMF), a registration request message requesting a registration to a serving public land mobile network (PLMN), the registration request message comprising paging adjustment information for normal paging of the wireless device.

In an example, the wireless device may receive from the AMF, a registration accept message, indicating a successful registration with the serving PLMN, the registration accept message comprising paging adjustment parameters for normal paging.

In an example, the wireless device may receive from a base station, a radio resource control (RRC) release message to transition the wireless device from an RRC connected state to an RRC idle state.

In an example, the wireless device may determine, a paging monitoring occasion, based on the paging adjustment parameters and system information for paging.

In an example, the wireless device may receive, paging messages in the paging monitoring occasion.

In an example, the wireless device may send to the base station, an RRC message to request a connection setup.

In an example, the wireless device may be connected to a public land mobile network (PLMN) that is different from the serving PLMN that comprises the AMF.

In an example, a side link communication of the wireless device may be activated.

In an example, a multimedia broadcast/multicast system communication of the wireless device may be activated.

In an example, the paging adjustment information may comprises non-preferred system frame number for paging, preferred system frame number for paging, a conflicted system frame number for paging, a requested paging offset value represented as a system frame number, a requested paging offset value represented as a time period, a requested paging offset value represented as a UE identity, an indication that paging repetition is required, an indication that paging occasion is conflicted, a requested paging repetition number, non-preferred frequency/band for paging, preferred frequency/band for paging, an indication that a UE specific discontinuous reception (DRX) being preferred, and/or the like.

In an example, the wireless device may determine the paging adjustment information based on a paging monitoring occasion of a public land mobile network (PLMN) A that is different from the serving PLMN that comprises the AMF and the base station.

In an example, the determining may be further based on a paging collision between a paging monitoring occasion of the serving PLMN and the paging monitoring occasion of the PLMN A.

In an example, the determining may be further based on how to allocate a paging monitoring occasion of the serving PLMN approximate time to the paging monitoring occasion of the PLMN A.

In an example, the determining may be further based on adjacent time of the paging monitoring occasion of the PLMN A.

In an example, the wireless device may determine the paging adjustment information based on a monitoring time for a side link communication.

In an example, the wireless device may determine the paging adjustment information based on a monitoring time for a multimedia broadcast/multicast system communication.

In an example, the paging adjustment parameters may comprise a paging time offset comprising number of radio frames and/or number of radio sub-frames, a paging UE identity offset, frequency/band information for paging, frequency/band information not used for paging, paging repetition number, an indication that a UE specific discontinuous reception (DRX) is prioritized, and/or the like.

In an example, a paging monitoring occasion may be shifted based on the paging time offset in response to the paging adjustment parameters being the paging time offset.

In an example, the UE specific discontinuous reception (DRX) value may be used instead of a default DRX value of the base station, in response to the paging adjustment parameters being the indication.

In an example, the UE specific DRX may be provided by the wireless device to the AMF during registration procedure with the serving PLMN.

In an example, system information of the base station may comprise the default DRX value.

In an example, a UE identity may be used for an equation of the paging monitoring occasion.

In an example, the paging UE identity offset may be used to modify the UE identity for the equation, in response to the paging adjustment parameters being the paging UE identity offset.

In an example, the paging repetition number may be used to receive/transmit paging message based on a paging monitoring occasion.

In an example, the frequency/band information for paging may be used for cell selection/reselection of the wireless device as a higher priority frequency/band.

In an example, the frequency/band information not used for paging may be used for cell selection/reselection of the wireless device as a lower priority frequency/band.

In an example, a wireless device may send to an access and mobility management function (AMF), a registration request message requesting a registration to a public land mobile network (PLMN), the registration request message comprising paging adjustment information for normal paging of the wireless device.

In an example, the wireless device may receive from the AMF, a registration accept message, indicating a successful registration with the PLMN, the registration accept message comprising paging adjustment parameters for normal paging.

In an example, the wireless device may receive from a base station, a radio resource control (RRC) release message to transition the wireless device from an RRC connected state to an RRC inactive state, the RRC release message comprising paging adjustment parameters for radio access network (RAN) paging.

In an example, the wireless device may determine, a paging monitoring occasion, based on the RAN paging adjustment parameters and system information for RAN paging.

In an example, the wireless device may receive, paging messages in the paging monitoring occasion.

In an example, the wireless device may send, to the base station, an RRC message to request a connection resumption.

In an example, a base station may receive from an access and mobility management function (AMF), a core network assistance information to assist a radio access network (RAN) paging, the core network assistance information comprising a core network parameter for paging adjustment of a wireless device.

In an example, the base station may send to the wireless device, a radio resource control (RRC) message to transition the wireless device from an RRC connected state to the RRC inactive state, the RRC message comprising a parameter for RAN paging adjustment based on the core network parameter.

In an example, the base station may send to the wireless device, the RAN paging based on the parameter for the RAN paging adjustment.

In an example, the base station may receive from the wireless device, an RRC message to request a connection resuming with the wireless device.

In an example, wherein the wireless device may be connected to a public land mobile network (PLMN) that is different from a PLMN that comprises the AMF and the base station.

In an example, a side link communication of the wireless device may be activated.

In an example, a multimedia broadcast/multicast system communication of the wireless device may be activated.

In an example, the core network parameter comprises non-preferred system frame number for paging, preferred system frame number for paging, a conflicted system frame number for paging, a requested paging offset value represented as a system frame number, a requested paging offset value represented as a time period, a requested paging offset value represented as a UE identity, an indication that paging repetition is required, an indication that paging occasion is conflicted, a requested paging repetition number, non-preferred frequency/band for paging, preferred frequency/band for paging, an indication that a UE specific discontinuous reception (DRX) being preferred.

In an example, the core network parameter comprises a paging time offset comprising number of radio frames and/or number of radio sub-frames, a paging UE identity offset, frequency/band information for paging, frequency/band information not used for paging, paging repetition number, an indication that a UE specific discontinuous reception (DRX) is prioritized, and/or the like.

In an example, the parameter for RAN paging comprises a paging time offset comprising number of radio frames and/or number of radio sub-frames, a paging UE identity offset, frequency/band information for paging, frequency/band information not used for paging, paging repetition number, an indication that a UE specific discontinuous reception (DRX) is prioritized, and/or the like.

In an example, a RAN paging monitoring occasion may be shifted based on the paging time offset in response to the parameter for RAN paging being the paging time offset.

In an example, the UE specific discontinuous reception (DRX) value may be used for a RAN paging monitoring occasion derivation instead of a default DRX value of the base station, in response to the parameter for RAN paging being the indication.

In an example, the UE specific DRX may be provided by the wireless device to the AMF during registration procedure with the serving PLMN.

In an example, system information of the base station may comprise the default DRX value.

In an example, a UE identity may be used for an equation of the paging monitoring occasion.

In an example, the paging UE identity offset may be used to modify the UE identity for the equation, in response to the parameter for RAN paging being the paging UE identity offset.

In an example, the paging repetition number may be used to receive/transmit paging message based on a paging monitoring occasion.

In an example, the frequency/band information for paging may be used for cell reselection of the wireless device as a higher priority frequency/band.

In an example, the frequency/band information not used for paging may be used for cell reselection of the wireless device as a lower priority frequency/band.

In an example, the core network parameter may be the parameter for the RAN paging adjustment.

In an example, the core network assistance information may further comprise a UE identity index value, a UE specific discontinuous reception (DRX), a periodic registration area update time value, a mobile initiated connection only (MICO) mode indication, a registration area, an expected UE behavior, and/or the like.

In an example, a network data analytics function (NWDAF) may receive from a wireless device, a paging collision indication message to indicate an occurrence of a paging collision with other system, the paging collision indication message comprising a public land mobile network (PLMN) identity and a cause value.

In an example, the NWDAF may send, to the wireless device, a paging collision report request message to request a report of the paging collision information.

In an example, the NWDAF may receive from the wireless device, a paging collision report message, the paging collision report message comprising a PLMN identity and paging parameters of the PLMN.

In an example, the NWDAF may determine paging parameters update of a base station based on the received a paging collision report request message.

In an example, the NWDAF may send, to the base station, a paging parameter configuration message comprising new paging parameters.

According to various embodiments, a device such as, for example, a wireless device, a device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 35:
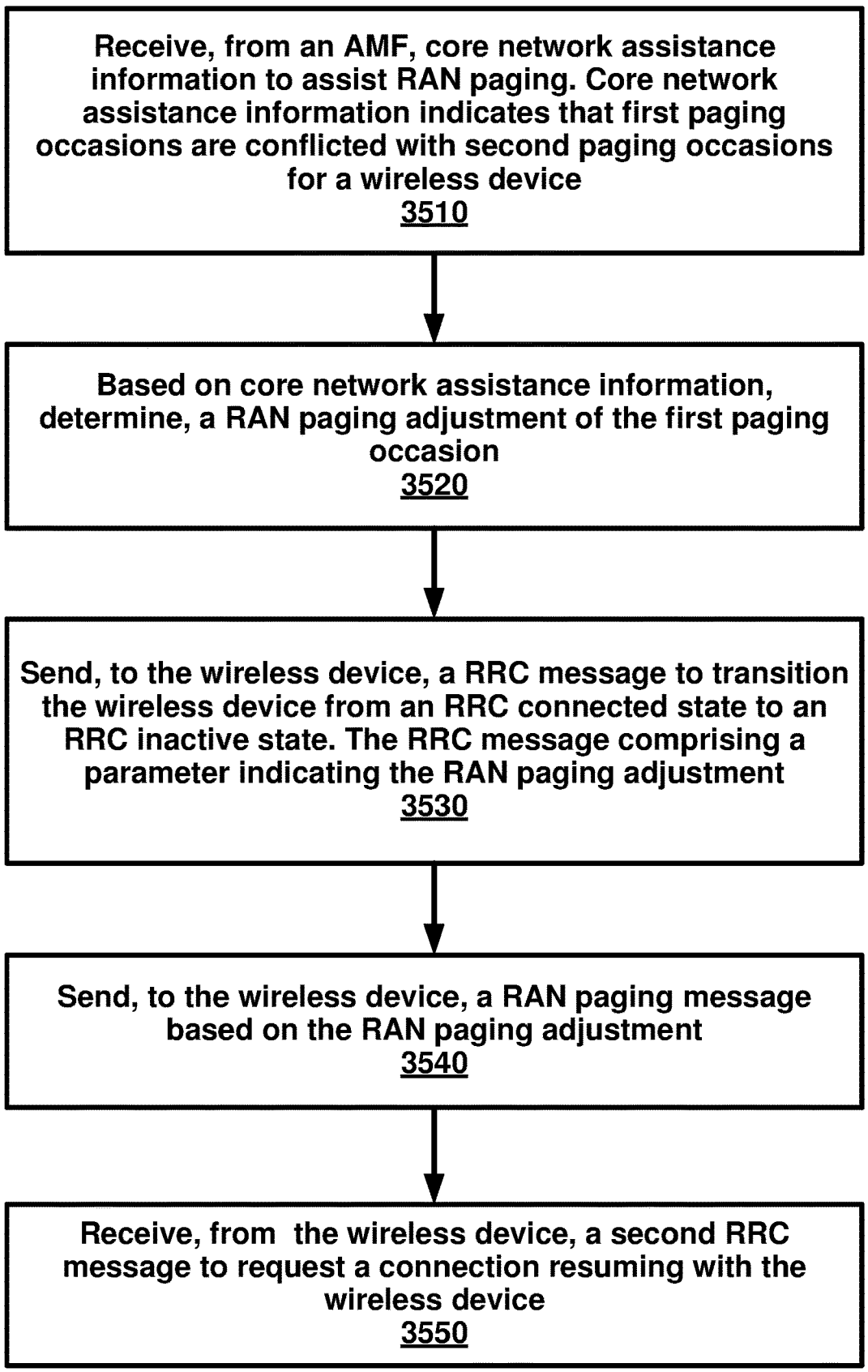
FIG. 35 is a flow diagram of an aspect of an example embodiment of the present disclosure.

FIG. 35 is a flow diagram as per an aspect of an example embodiment of the present disclosure. At 3510, a base station may receive from an access and mobility management function (AMF), core network assistance information to assist radio access network (RAN) paging. The core network assistance information may indicate that first paging occasions are conflicted with second paging occasions for a wireless device. At 3520, based on the core network assistance information, the base station may determine a RAN paging adjustment of the first paging occasions. At 3530, the base station may send a radio resource control (RRC) message to the wireless device. The RRC message may transition the wireless device from an RRC connected state to an RRC inactive state. The RRC message may comprise a parameter indicating the RAN paging adjustment. At 3540, the base station may send, to the wireless device, a RAN paging message based on the RAN paging adjustment. At 3550, the base station may receive from the wireless device, a second RRC message to request a connection resuming with the wireless device.

According to an embodiment, the wireless device may be connected to a second public land mobile network (PLMN). The second PLMN may be different from a PLMN that comprises the AMF and the base station. According to an embodiment, the second paging occasions may be associated with the second PLMN. According to an embodiment, the first paging occasions may be associated with the PLMN. According to an embodiment, the second paging occasions may be associated with a side link communication of the wireless device. According to an embodiment, the second paging occasions may be associated with a multimedia broadcast system communication of the wireless device. According to an embodiment, the core network assistance information may comprise a non-preferred system frame number for paging. The core network assistance information may comprise a non-preferred system frame number for a paging preferred system frame number for paging. The core network assistance information may comprise a conflicted system frame number for paging. The core network assistance information may comprise a requested paging offset value represented as a system frame number. The core network assistance information may comprise a requested paging offset value represented as a time period. The core network assistance information may comprise a requested paging offset value represented as a user equipment identity. The core network assistance information may comprise an indication that paging repetition is required. The core network assistance information may comprise an indication that paging occasion is conflicted. The core network assistance information may comprise a requested paging repetition number. The core network assistance information may comprise a non-preferred band for paging. The core network assistance information may comprise a preferred band for paging. The core network assistance information may comprise an indication that a user equipment specific discontinuous reception (DRX) is preferred.

According to an embodiment, the core network assistance information may comprise a paging time offset comprising number of radio frames and number of radio sub-frames. The core network assistance information may comprise a paging user equipment identity offset. The core network assistance information may comprise band information for paging. The core network assistance information may comprise band information not used for paging. The core network assistance information may comprise paging repetition number. The core network assistance information may comprise an indication that a user equipment specific discontinuous reception (DRX) is prioritized.

According to an embodiment, the parameter for RAN paging adjustment may comprise a paging time offset comprising number of radio frames and number of radio subframes. The parameter for RAN paging adjustment may comprise a paging user equipment identity offset. The parameter for RAN paging adjustment may comprise band information for paging. The parameter for RAN paging adjustment may comprise band information not used for paging. The parameter for RAN paging adjustment may comprise paging repetition number. The parameter for RAN paging adjustment may comprise an indication that a user equipment specific discontinuous reception (DRX) is prioritized.

According to an embodiment, the core network assistance information may further comprise a user equipment specific discontinuous reception (DRX). The core network assistance information may further comprise a periodic registration area update time value. The core network assistance information may further comprise a mobile initiated connection only (MICO) mode indication. The core network assistance information may further comprise a registration area. The core network assistance information may further comprise an expected user equipment behavior.

Figure 36:
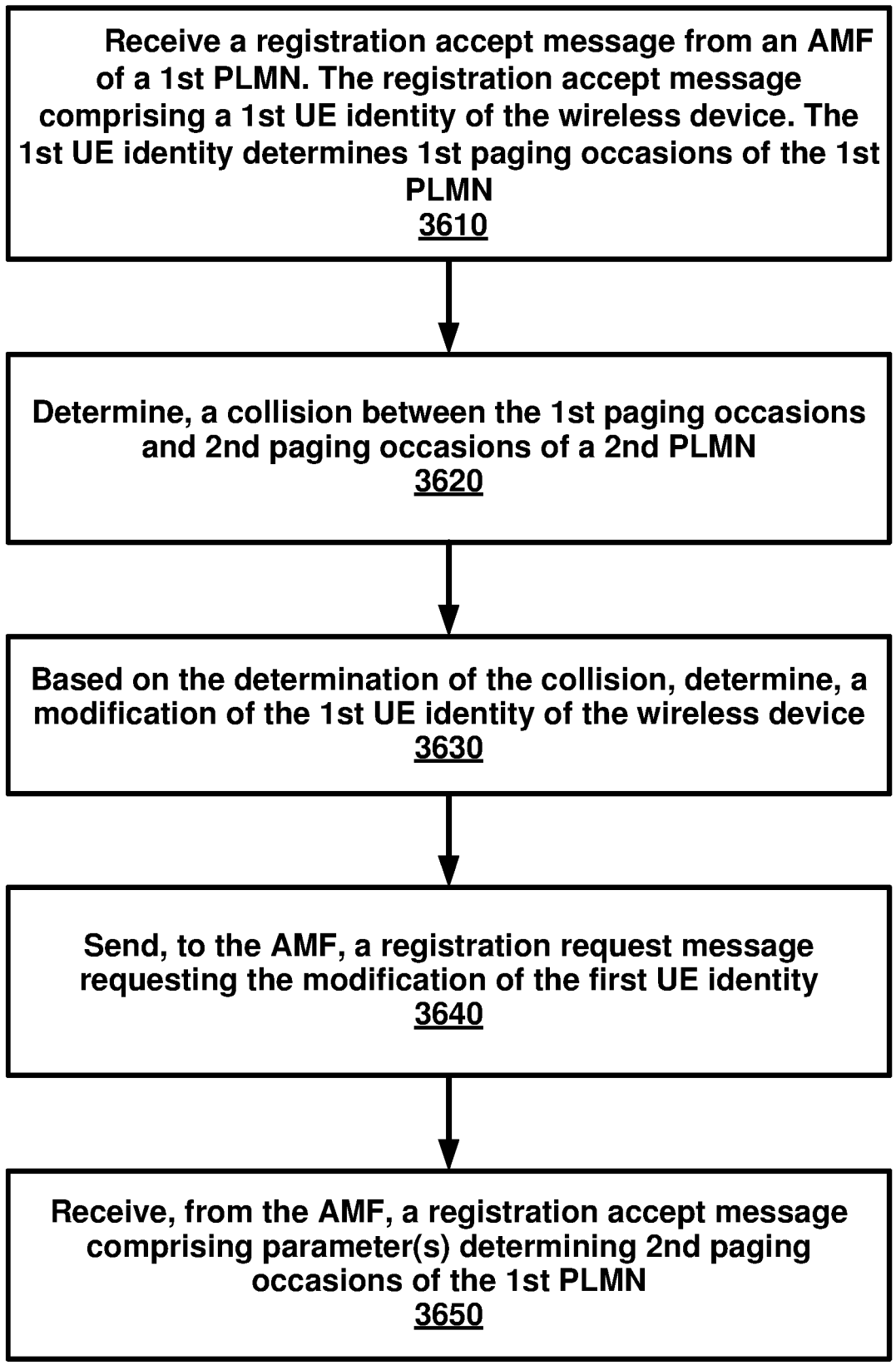
FIG. 36 is a flow diagram of an aspect of an example embodiment of the present disclosure.

FIG. 36 is a flow diagram as per an aspect of an example embodiment of the present disclosure. At 3610, a wireless device may receive from an access and mobility management function (AMF) of a first public land mobile land (PLMN), a registration accept message comprising a first user equipment (UE) identity of the wireless device. The first UE identity may determine first paging occasions of the first PLMN. At 3620, the wireless device may determine a collision between the first paging occasions and second paging occasions of a second PLMN. At 3630, based on the determination of the collision, the wireless device may determine a modification of the first UE identity of the wireless device. At 3640, the wireless device may send to the AMF, a registration request message requesting the modification of the first UE identity. At 3650, the wireless device may receive from the AMF, a registration accept message comprising one or more parameters determining second paging occasions of the first PLMN.

According to an embodiment, the first UE identity may be a 5 generation globally unique temporary identifier (5G-GUTI). According to an embodiment, the first paging occasions may be based on the 5G-GUTI.

According to an embodiment, the registration request message may comprise the first UE identity. The registration request message may comprise a UE identity offset associated with the first UE identity.

According to an embodiment, the wireless device may be a multi-subscriber identity module (SIM) UE. According to an embodiment, the wireless device may be a dual-SIM UE.

Figure 37:
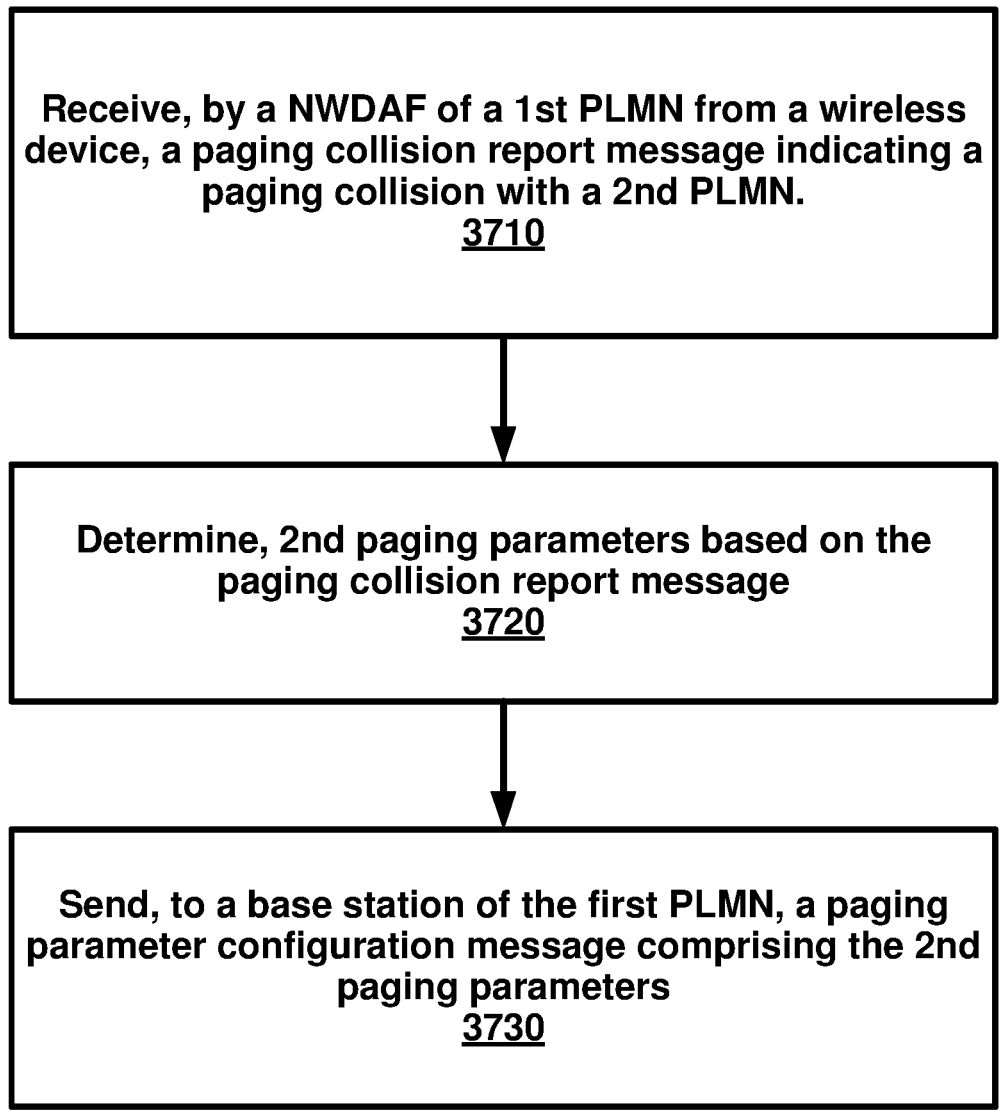
FIG. 37 is a flow diagram of an aspect of an example embodiment of the present disclosure.

FIG. 37 is a flow diagram as per an aspect of an example embodiment of the present disclosure. At 3710, a network data analytics function (NWDAF) of a first public land mobile network (PLMN) may receive from a wireless device, a paging collision report message indicating a paging collision with a second PLMN. The paging collision report message may comprise a PLMN identity of the second PLMN and first paging parameters of the second PLMN. At 3720, the NWDAF may determine second paging parameters based on the paging collision report message. At 3730, the NWDAF may send to a base station of the first PLMN, a paging parameter configuration message comprising the second paging parameters.

According to an embodiment, the NWDAF may receive a paging collision indication comprising the PLMN identity of the second PLMN and a cause value. The NWDAF may send to the wireless device, a paging collision report request message based on the paging collision indication.

According to an embodiment, first paging occasions of the second PLMN and second paging occasions of the first PLMN may be conflicted. According to an embodiment, the reception of the paging collision report message may be based on the paging collision report request message.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
   receiving, by a base station of a first public land mobile network (PLMN) from a wireless device, a requested international mobile subscriber identity (IMSI) offset value for offsetting an IMSI of the wireless device;
   sending, by the base station to a core network node, the requested IMSI offset value;
   receiving, by the base station from the core network node, an accepted IMSI offset value for offsetting the IMSI of the wireless device, wherein first paging occasions of the first PLMN are derived using an alternative IMSI determined based on a sum of:
      the IMSI of the wireless device; and
      the accepted IMSI offset value; and
   sending, by the base station to the wireless device, the accepted IMSI offset value.

2. The method of claim 1, wherein the base station sends the requested IMSI offset value received from the wireless device based on a collision between second paging occasions of the first PLMN and third paging occasions of a second PLMN.

3. The method of claim 1, wherein the core network node is a mobility management function in a core network of the first PLMN.

4. The method of claim 1, wherein the requested IMSI offset value is included in a request for a registration of the wireless device that the core network node receives from the wireless device.

5. The method of claim 4, wherein the accepted IMSI offset value is included in an acceptance of the registration of the core network node transmits to the wireless device.

6. The method of claim 1, wherein the wireless device prioritizes a second PLMN over the first PLMN.

7. The method of claim 1, wherein the wireless device is a multiple universal subscriber identity module (multi-USIM) device.

8. A base station of a first public land mobile network (PLMN) comprising:
   one or more processors; and
   memory storing instructions that, when executed by the one or more processors, cause the base station to:
      receive, from a wireless device, a requested international mobile subscriber identity (IMSI) offset value for offsetting an IMSI of the wireless device;
      send, to a core network node, the requested IMSI offset value;
      receive, from the core network node, an accepted IMSI offset value for offsetting the IMSI of the wireless device, wherein first paging occasions of the first PLMN are derived using an alternative IMSI determined based on a sum of:
         the IMSI of the wireless device; and
         the accepted IMSI offset value; and
      send, to the wireless device, the accepted IMSI offset value.

9. The base station of claim 8, wherein the base station sends the requested IMSI offset value received from the wireless device based on a collision between second paging occasions of the first PLMN and third paging occasions of a second PLMN.

10. The base station of claim 8, wherein the core network node is a mobility management function in a core network of the first PLMN.

11. The base station of claim 8, wherein the requested IMSI offset value is included in a request for a registration of the wireless device that the core network node receives from the wireless device.

12. The base station of claim 11, wherein the accepted IMSI offset value is included in an acceptance of the registration of the core network node transmits to the wireless device.

13. The base station of claim 8, wherein the wireless device prioritizes a second PLMN over the first PLMN.

14. The base station of claim 8, wherein the wireless device is a multiple universal subscriber identity module (multi-USIM) device.

15. A non-transitory computer-readable medium comprising instructions that, when executed by one or more processors of a base station of a first public land mobile network (PLMN), cause the base station to:
- receive, from a wireless device, a requested international mobile subscriber identity (IMSI) offset value for offsetting an IMSI of the wireless device;
- send, to a core network node, the requested IMSI offset value;
- receive, from the core network node, an accepted IMSI offset value for offsetting the IMSI of the wireless device, wherein first paging occasions of the first PLMN are derived using an alternative IMSI determined based on a sum of:
  - the IMSI of the wireless device; and
  - the accepted IMSI offset value; and
- send, to the wireless device, the accepted IMSI offset value.

16. The non-transitory computer-readable medium of claim 15, wherein the base station sends the requested IMSI offset value received from the wireless device based on a collision between second paging occasions of the first PLMN and third paging occasions of a second PLMN.

17. The non-transitory computer-readable medium of claim 15, wherein the core network node is a mobility management function in a core network of the first PLMN.

18. The non-transitory computer-readable medium of claim 15, wherein the requested IMSI offset value is included in a request for a registration of the wireless device that the core network node receives from the wireless device.

19. The non-transitory computer-readable medium of claim 18, wherein the accepted IMSI offset value is included in an acceptance of the registration of the core network node transmits to the wireless device.

20. The non-transitory computer-readable medium of claim 15, wherein the wireless device prioritizes a second PLMN over the first PLMN.

* * * * *